(12) United States Patent
Guo et al.

(10) Patent No.: US 9,807,426 B2
(45) Date of Patent: Oct. 31, 2017

(54) APPLYING NON-SQUARE TRANSFORMS TO VIDEO DATA

(75) Inventors: Liwei Guo, San Diego, CA (US); Joel Sole Rojals, La Jolla, CA (US); Rajan Laxman Joshi, San Diego, CA (US); Peisong Chen, San Diego, CA (US); Xianglin Wang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 470 days.

(21) Appl. No.: 13/422,828

(22) Filed: Mar. 16, 2012

(65) Prior Publication Data

US 2013/0003824 A1 Jan. 3, 2013

Related U.S. Application Data

(60) Provisional application No. 61/503,726, filed on Jul. 1, 2011, provisional application No. 61/554,837, filed on Nov. 2, 2011.

(51) Int. Cl.
*H04N 7/50* (2006.01)
*H04N 19/96* (2014.01)
(Continued)

(52) U.S. Cl.
CPC ........... *H04N 19/96* (2014.11); *H04N 19/119* (2014.11); *H04N 19/122* (2014.11);
(Continued)

(58) Field of Classification Search
None
See application file for complete search history.

(56) References Cited

U.S. PATENT DOCUMENTS

2006/0268982 A1 11/2006 Lee et al.
2010/0086049 A1* 4/2010 Ye et al. .................. 375/240.16
(Continued)

FOREIGN PATENT DOCUMENTS

CN 1874521 A 12/2006
WO 2011068527 A1 6/2011

OTHER PUBLICATIONS

Panusopone et al. ,Efficient Transform Unit Representation, Jan. 20-28, 2011.*
(Continued)

*Primary Examiner* — Andy Rao
*Assistant Examiner* — Samuel D Fereja

(57) ABSTRACT

In one example, a device for coding video data includes a video coder, such as a video encoder or a video decoder, that is configured to code information indicative of whether a transform unit of the video data is square or non-square, and code data of the transform unit based at least in part on whether the transform unit is square or non-square. In this manner, the video coder may utilize non-square transform units. The video coder may be configured to use non-square transform units for certain situations, such as only for chrominance or luminance components or only when a corresponding prediction unit is non-square. The video coder may further be configured to perform an entropy coding process that selects context for coding data of the transform unit based on whether the transform unit is square or non-square.

46 Claims, 11 Drawing Sheets

(51) Int. Cl.
   H04N 19/176 (2014.01)
   H04N 19/70 (2014.01)
   H04N 19/119 (2014.01)
   H04N 19/46 (2014.01)
   H04N 19/122 (2014.01)
(52) U.S. Cl.
   CPC ........... *H04N 19/176* (2014.11); *H04N 19/46* (2014.11); *H04N 19/70* (2014.11)

(56) References Cited

U.S. PATENT DOCUMENTS

| | | | | |
|---|---|---|---|---|
| 2011/0038412 | A1* | 2/2011 | Jung et al. | 375/240.12 |
| 2012/0081241 | A1* | 4/2012 | Misra et al. | 341/107 |
| 2012/0223950 | A1* | 9/2012 | Liu et al. | 345/467 |
| 2012/0230394 | A1* | 9/2012 | Lu et al. | 375/240.02 |
| 2012/0281928 | A1* | 11/2012 | Cohen et al. | 382/240 |
| 2013/0129237 | A1* | 5/2013 | Yie et al. | 382/233 |

OTHER PUBLICATIONS

McCann, et al., "Samsung's Response to the Call for Proposals on Video Compression Technology," Joint Collaborative Team on Video Coding (JCT-VC) of ITU-T SG-16 WP3 and ISO/IEC JTC1/SC29/WG11, 1st meeting, Document: JCTVC-A124, Dresden, DE, Apr. 15-23, 2010, 42 pp.

International Preliminary Report on Patentability—PCT/US2012/044043, The International Bureau of WIPO—Geneva, Switzerland, Oct. 4, 2013, 9 pp.

Second Written Opinion of international application No. PCT/US2012/044043, dated Jul. 12, 2013, 8, pp.

Bross et al., "High efficiency video coding (HEVC) text specification draft 6," Joint Collaborative Team on Video Coding, JCTVC-H1003, Nov. 21-30, 2011, 259 pp.

Bross et al., "High efficiency video coding (HEVC) text specification draft 7," Joint Collaborative Team on Video Coding, JCTVC-I1003_D2, Apr. 27-May 7, 2012, 290 pp.

Bross et al., "High efficiency video coding (HEVC) text specification draft 8," Joint Collaborative Team on Video Coding, JCTVC-J1003_D7, Jul. 11-20, 2012, 261 pp.

Bross et al., "WD4: Working Draft 4 of High-Efficiency Video Coding," Joint Collaborative Team on Video Coding, JCTVC-F803_d2, Jul. 14-22, 2011, 226 pp.

Bross et al., "WD5: Working Draft 5 of High-Efficiency Video Coding," Joint Collaborative Team on Video Coding, JCTVC-G1103_d2, Nov. 21-30, 2011, 214 pp.

Cao et al., "CE6.b1 Report on Short Distance Intra Prediction Method", Joint Collaborative Team on Video Coding, JCTVC-E278, Mar. 16-23, 2011, 5 pp.

Dinstein et al., "Variable block-size transform image coder", IEEE Transactions on Communications, vol. 38, No. 11, Nov. 1990, 6 pp.

Guo et al., "Non-Square Transform for 2N×N and N×2N Motion Partitions", Joint Collaborative Team on Video Coding, JCTVC-F563, Jul. 14-22, 2011, 9 pp.

International Search Report and Written Opinion—PCT/US2012/044043—ISA/EPO—Nov. 30, 2012—22 pp.

International Telecommunication Union, "Advanced video coding for generic audiovisual services," Standardization Sector of ITU, Jun. 2011, 674 pp.

Lee et al., "A hierarchical variable-sized block transform coding scheme for coding efficiency improvement on H.264/AVC", 2010 Picture Coding Symposium PCS 2010, Dec. 8-10, 2010, 4 pp.

Partial International Search Report—PCT/US2012/044043—ISA/EPO—Aug. 28, 2012 11 pp.

Wiegand et al., "WD2: Working Draft 2 of High-Efficiency Video Coding", Joint Collaborative Team on Video Coding, JCTVC-D503, Jan. 20-28, 2011, 153 pp.

Wiegand et al., "WD3: Working Draft 3 of High-Efficiency Video Coding," Joint Collaborative Team on Video Coding, JCTVC-E603, Mar. 16-23, 2011,193 pp.

Wiegand et al.,"WD1: Working Draft 1 of High-Efficiency Video Coding", Joint Collaborative Team on Video Coding, JCTVC-C403, Oct. 7-15, 2010, 137 pp.

Wien et al., "Hybrid video coding using variable size block transforms" Visual Communications and Image Processing; Jan. 2002, 12 pp.

De Forni, R. et al., "On the Benefits of Leaf Merging in Quad-tree Motion Models," IEEE International Conference on Image Processing, 2005, Sep. 11-14, 2005, 4 pp.

Han, W.J. et al., "Improved Video Compression Efficiency Through Flexible Unit Representation and Corresponding Extension of Coding Tools," IEEE Transactions on Circuits and Systems for Video Technology, vol. 20 , No. 12, Dec. 2010, 12 pp.

Hang, H.M. et al., "Towards the Next Video Standard: High Efficiency Video Coding," Proceedings of the Second APSIPA Annual Summit and Conference, Dec. 14-17, 2010, 10 pp.

Sethuraman, "Stereoscopic Image Sequence Compression Using Multiresolution and Quadtree Decomposition Based Disparity- and Motion- Adaptive Segmentation," Carnegie Mellon University, Jul. 1996, 138 pages.

Yuan, T. et al., "CE2: Non-Square Quadtree Transform for symmetric and asymmetric motion partition," Joint Collaborative Team on Video Coding, Document: JCTVC-F412, Jul. 14-22, 2011, 7 pgs.

Panusopone et al, "Proposal on RQT root location," Joint Collaborative Team on Video Coding (JCT-VC) of ITU-T SG16 WP3 and ISO/IEC JTC1/SC29/WG11, JCTVC-E364-r2, Mar. 16-23, 2011, 10 pp.

Yuan et al, "Asymmetric motion partition with OBMC and Non-Square TU," Joint Collaborative Team on Video Coding (JCT-VC) of ITU-T SG16 WP3 and ISO/IEC JTC1/SC29/WG11, JCTVC-E376, Mar. 16-23, 2011, 6 pp.

Bossen F., "Common test conditions and software reference configurations," 4th Meeting: Daegu, KR, Jan. 20-28, 2011, WG11 No. m19497, Joint Collaborative Team on Video Coding (JCT-VC) of ITU-T SG16 WP3 and ISO/IEC JTC1/SC29/WG11, Document: JCTVC-D600, Feb. 14, 2011, 9 pages.

Chen Y-W., et al., "Crosscheck for Qualcomm's Transform in JCTVC-F563," 6th meeting: Torino, IT, Jul. 14 through 22, 2011, Joint Collaborative Team on Video Coding (JCT-VC) of ITU-T SG16 WP3 and ISO/IEC JTC1/SC29/WG11, Document: JCTVC-F624, Jul. 9, 2011, 1 page.

Guo L., et al.,"Non-Square Transform for 2N×N and N×2N Motion Partitions" , 6. JCT-VC Meeting; 97. MPEG Meeting; Jul. 14 through 22, 2011; Torino; (Joint Collaborative Team on Video Coding of ISO/ IEC JTC1/SC29/WG11 and ITU-T SG. 16) ; URL: http://wftp3.itu.int/av-arch/jctvc-site/,, No. JCTVC-F563, 16 Jul. 16, 2011, XP030009586, 9 pp.

* cited by examiner

| SPLIT FLAG |
| :---: |
| 180 |
| TRANSFORM SELECTION FLAG |
| 182 |
| LUMA CBF |
| 184 |
| CHROMA-U CBF |
| 186 |
| CHROMA-V CBF |
| 188 |

FIG. 10A

| SPLIT FLAG |
| :---: |
| 190 |
| TS FLAG |
| 192 |
| CBFYY FLAG |
| 194 |
| CBFY0 FLAG |
| 196 |
| CBFY1 FLAG |
| 198 |
| CBFUV FLAG |
| 200 |
| CBF-U FLAG |
| 202 |
| CBF-V FLAG |
| 204 |

FIG. 10B

APPLYING NON-SQUARE TRANSFORMS TO VIDEO DATA

This application claims priority to U.S. Provisional Application No. 61/503,726, filed Jul. 1, 2011, and to U.S. Provisional Application No. 61/554,837, filed Nov. 2, 2011, the entire contents of each of which are incorporated herein by reference.

TECHNICAL FIELD

This disclosure relates to video coding, and more particularly, to transforming video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into blocks, such as macroblocks or coding units (CUs). Each block can be further partitioned. Blocks in an intra-coded (I) frame or slice are encoded using spatial prediction with respect to neighboring blocks. Blocks in an inter-coded (P or B) frame or slice may use spatial prediction with respect to neighboring blocks in the same frame or slice or temporal prediction with respect to other reference frames.

SUMMARY

In general, this disclosure describes techniques for applying non-square transforms to blocks of video data, such as residual video data or inverse non-square transforms for reproducing residual video data. Rather than restrict transform sizes to only square transforms, the techniques may enable a video coder (which may refer to a video encoder, a video decoder or a combination of both the video encoder and the video decoder) to also assess and potentially select application of non-square transforms to video data. By applying a non-square transform to video data, the video coder may reduce artifacts and distortion introduced when square transforms are applied across prediction boundaries (which is a boundary between two distinct blocks of video data identified by two distinct prediction units (PUs) for which motion estimation is separately performed).

In some instances, rather than apply a single square transform across two non-square blocks of adjacent PUs (that often form a square prediction block when combined), the techniques may enable a video coder to apply matching non-square transforms (in that each of the non-square transforms matches the size and shape of the corresponding blocks identified by the PUs) to individually transform each of the non-square blocks of the PUs with the result of potentially reducing the number of non-zero coefficients in comparison to applying the single square transform across the two blocks of the PU. In reducing the number of non-zero coefficients, the techniques may reduce the amount of data required to represent the residual video data, producing a more compressed version of the residual video data in comparison to techniques that do not enable application of non-square transforms.

In one example, a method of coding video data includes coding information indicative of whether a transform unit of the video data is square or non-square, and coding data of the transform unit based at least in part on whether the transform unit is square or non-square.

In another example, a device for coding video data includes a video coder configured to code information indicative of whether a transform unit of the video data is square or non-square, and code data of the transform unit based at least in part on whether the transform unit is square or non-square.

In another example, a device for coding video data includes means for coding information indicative of whether a transform unit of the video data is square or non-square, and means for coding data of the transform unit based at least in part on whether the transform unit is square or non-square.

In another example, a computer program product includes a computer-readable medium having stored thereon instructions that, when executed, cause a processor to code information indicative of whether a transform unit of the video data is square or non-square, and code data of the transform unit based at least in part on whether the transform unit is square or non-square.

The details of one or more examples are set forth in the accompanying drawings and the description below. Other features, objects, and advantages will be apparent from the description and drawings, and from the claims.

BRIEF DESCRIPTION OF DRAWINGS

FIG. 10A is a conceptual diagram illustrating example signaling data for signaling whether a CU includes square or non-square transform units.

FIG. 10B is a conceptual diagram illustrating alternative example signaling data for signaling whether a CU includes square or non-square TUs.

DETAILED DESCRIPTION

Figure 1:
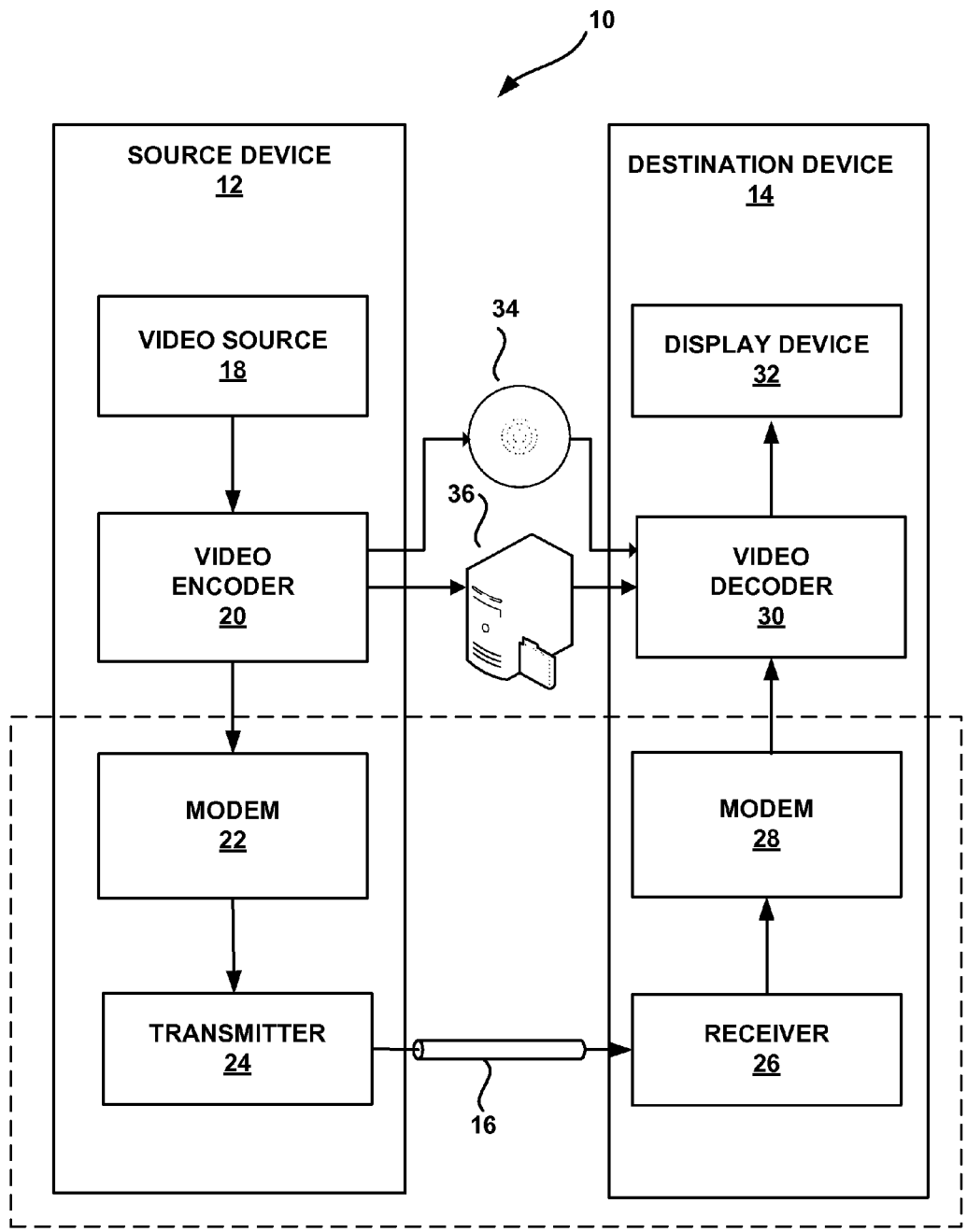
FIG. 1 is a block diagram illustrating an example video encoding and decoding system.

In general, video data includes a sequence of frames, which may be coded in an intra-prediction mode or an inter-prediction mode. The frames may be divided into blocks of video data and an encoding mode may be selected for each block. In inter-prediction modes, the blocks may be predicted relative to data of one or more previously coded frames. In intra-prediction modes, the blocks may be predicted relative to one or more spatially neighboring, previously coded blocks of the same frame.

In accordance with High Efficiency Video Coding (HEVC), frames may be divided into largest coding units (LCUs), which may comprise, for example, 32×32 pixel blocks or 64×64 pixel blocks. In general, LCUs may be partitioned into sub-coding units (sub-CUs), each of which may be further partitioned (recursively). In general, the term coding unit (CU) may refer to an LCU or any sub-CU thereof (e.g., a sub-CU of an LCU or a sub-CU of another sub-CU). CUs may be partitioned into four square, non-overlapping sub-CUs.

An LCU may correspond to a quadtree data structure that includes one or more nodes, where a root node of the quadtree corresponds to the LCU itself and other nodes correspond to sub-CUs of the LCU. An unpartitioned CU generally corresponds to a leaf node of the quadtree (that is, a node of the quadtree that does not have any child nodes). Accordingly, an unpartitioned CU may be referred to as a leaf-node CU. Leaf node CUs generally include one or more prediction units (PUs) that describe how data for the CU is predicted (i.e., whether the data was intra-coded or inter-coded), and one or more transform units (TUs) which correspond to residual data, that is, pixel-by-pixel differences between predicted data for the CU and original data for the CU.

The HEVC test model (which is often abbreviated as "HM") defines video coder reference software for the next generation video coding standard known commonly as "HEVC." In HEVC, a leaf CU can be split into different PUs, with each PU defining motion information for a portion of the leaf CU. In an inter-prediction mode, for each PU, motion compensation is performed to locate a temporal reference block in a reference frame. This temporal reference block typically represents a block that, when compared to (which often means in this context subtracted from) the PU, results in an amount of residual data below a defined threshold. The residual data include pixel difference values indicating differences between corresponding pixels of the PU and the reference block. If below this threshold, the video encoder generates motion information that identifies the location of the temporal reference block relative to the PU. The video encoder then stores the residual data generated from comparing the temporal reference block to the PU and stores the motion information defining, for example, a motion vector identifying the location of the temporal reference block relative to the PU. The residual data may be stored for the TU, and the motion vector may be stored for the PU.

HM further defines a quadtree-based residual quadtree transform (RQT) structure that includes data for one or more transform TUs for the CU. The RQT may be described as "recursive," in that a root node of the quadtree may have four child nodes, and generally, nodes of the tree may have four child nodes, where each node may be formatted in a similar manner. Thus, an LCU may include data corresponding to two distinct types of quadtrees: a CU quadtree that defines partitioning of the LCU into leaf node CUs, and for each leaf node CU, an RQT that includes data for TUs.

HM first defines a root level (which may also be referred to as "level 0") of the RQT, where the root level effectively represents a transform applied to the CU (where the shape and size of the CU is typically represented by the notation 2N×2N, where N commonly refers to a number of pixels in a block of video data corresponding to the CU that is a power of two). Video encoders that implement HM may apply a transform at the root level when transform coefficients of the leaf node CU correspond to level 0 of the RQT. In other words, a video encoder that implements HM may apply a transform to the residual data of the CU that matches in shape and size that of the CU.

HM further indicates that the CU (having a size of 2N×2N) may be divided into four equally sized sub-portions of transform coefficients data (where each portion is of size N×N) and transforms of size N×N may be applied to each of these N×N sub-portions of residual data. In this sense, the transform is applied to the so-called "level 1" of the RQT, as the root level represents level 0 and the division of the root level into the four N×N sub-portions represents level 1 of this structure.

To select a transform size, a video encoder may compare the results of applying a transform at the root level (or level 0) and level 1. The so-called "result" of applying the transform generally refers to the result of encoding the transformed residual data. To generate this result, the video encoder, as noted above, applies a transform to the residual data to transform the residual data from the spatial domain to the frequency domain, resulting in the generation of transform coefficients that represent the residual data in the form of transform coefficients serving as weights for basis functions, such as specified sine or cosine waveforms of different frequencies. The video encoder may then quantize these transform coefficients (which may also be referred to as transformed residual data) to round the transform coefficients. This quantization step typically involves rounding one or more of the smaller transform coefficients to zero. The video encoder may further code the transform coefficients. Quantization and coding therefore represent a lossy form of compression. The video encoder may then decode the video data, perform inverse quantization, and apply an inverse transform to reconstruct the video block.

This reconstructed video block may represent the result of applying the transform in this context. The reconstructed video block may then be compared to the original CU and an error may be determined between the original CU and the reconstructed video block. The video encoder may then compare the error determined when applying the transform at level 0 to the error determined in this manner when applying the transform at level 1.

In some instances, a more involved process referred to as rate distortion analysis or rate distortion optimization may be performed that considers a rate (in terms of bandwidth or storage space consumed) in addition to the error. The rate or bits used to express the encoded video data are mathematically measured by multiplying the bit cost by the Lagrangian, a value representing the relationship between a bit cost and quality for a particular quality level. The deviation from the source (which is referred to as error or distortion in this disclosure) is usually measured as the mean squared error, in order to maximize a peak signal-to-noise ratio (PSNR) video quality metric.

If the result of applying the transform at level 1 is better (in terms of the determined error or rate-distortion metric) than applying the transform at level 0, the video encoder may proceed to repeat this process with respect to each of the sub-portions, dividing each sub-portion into four equally sized second order sub-portions (of size N/2×N/2), thereby generating a level 2 of the recursive quadtree transform structure. The video encoder may then compare the result of applying the transform at level 2 to the result of applying the transform at level 1 for each first order sub-portion, selecting the level 2 transform if the result of applying the transform at level 2 is better (in terms of the determined error) than applying the transform at level 1. This process may continue in this recursive manner, successively splitting each sub-portion into four equally-sized sub-portions until either the transform applied at level M is better than that applied at level M+1 or some maximum transform level is reached. In some implementations, the video encoder may start at the maximum transform level, applying the smallest-sized transform blocks and merging the smaller sized transforms if the larger-sized transform performs better (in terms of determined error). For this reason, the transform structure may be referred to as a recursive quadtree transform structure.

Throughout the description of HM above, the size of transforms have only been described as being square (e.g., 2N×2N, N×N and N/2×N/2). The proposed HM currently limits the size of the transforms to squares, but provides for non-square, rectangular PU sizes, such as those shown in the example of FIG. 4 (described in greater detail below). Non-square PUs may result from a variety of partitioning modes for PUs. As one example, a video coder may partition a CU into PUs using asymmetric motion partitioning (AMP). As another example, a video coder may partition a CU into PUs using short distance intra-prediction (SDIP) or asymmetric SDIP. Video coders may be configured to avoid using TUs that cross PU boundaries. Therefore, providing for non-square TUs in accordance with the techniques of this disclosure (e.g., to match sizes of corresponding non-square PUs) may provide certain advantages.

For example, one result of only allowing square transforms or transform units (TUs) is that video encoders may apply a transform across a motion boundary (which refers to a boundary between adjacent PUs). Applying transforms across motion boundaries typically reduces the transform efficiency because motion boundaries often represent motion discontinuity where there may be hard edges or large changes in color or brightness that require many more transform coefficients to adequately capture these types of boundaries. Another result of only providing for square TUs but non-square PUs is that the video encoder may apply transforms that are smaller than the associated PU. Applying smaller-sized transforms relative to the PU may also reduce transform efficiency because the transform may not be able to fully exploit the correlation among neighboring pixels.

In accordance with the techniques described in this disclosure, the video encoder may apply non-square transforms to video data. Rather than restrict transform sizes to only square transforms, the techniques may enable a video coder (which may refer to a video encoder, a video decoder or a combination of both the video encoder and the video decoder) to also assess and potentially select application of non-square transforms to video data. By applying a non-square transform to video data, the video coder may reduce artifacts and distortion introduced when square transforms are applied across prediction boundaries (which is a boundary between two distinct blocks of video data identified by two distinct prediction units (PUs) for which motion estimation is separately performed). In addition, the techniques may improve transform efficiency in that the non-square transform may more fully exploit the correlation among neighboring pixels by avoiding application of smaller sized transforms to larger-sized PUs.

In some instances, rather than apply a single square transform to residual data resulting from two (or more) non-square, adjacent PUs (that may form a square prediction block when combined), these techniques may enable a video coder to apply matching non-square transforms (in that each of the non-square transforms may match the size of the blocks identified by the PUs) to individually transform residual data resulting from each of the non-square PUs with the result of potentially reducing the number of non-zero coefficients in comparison to applying the single square transform across the two blocks of the PU. In reducing the number of non-zero coefficients, the techniques may reduce the amount of data required to represent the video data, producing a more compressed version of the video data in comparison to techniques that do not enable application of non-square transforms.

To illustrate, the video encoder may apply a non-square transform to residual data corresponding to a non-square PU. As one example, for a PU size of N×M (where N and M are represent a different number of pixels that are often a power of two), the video encoder may additionally apply a transform of size N×M when generating the transform structure. As another example, for a PU of size 2N×N, the video encoder may apply transforms of size 2N×2N, 2N×N and N×N, selecting the one of these applied transforms based on the determined error of the result, as described above. In this manner, the video encoder may select a non-square transform size.

The techniques described in this disclosure may additionally modify the transform signaling structure (also referred to as a transform selection structure, that is, a structure that indicates what transform size was selected). The transform signaling structure may correspond to the residual quadtree transform structure. In particular, the transform signaling structure may be modified in accordance with these techniques to accommodate non-square transforms. A video encoder that implements these techniques may apply, when there is a PU of size 2N×N, both a transform of size 2N×2N and 2N×N at the root level (or level 0), in a process to determine which transform size to select for a set of residual data.

The transform signaling structure may therefore specify that the video encoder is to apply both of these transforms when there is a PU associated with this CU of size 2N×N. The video encoder may then compare the result of applying this transform (which again refers to the errors determined in the manner described above), selecting the one of these transforms of size 2N×2N or 2N×N based on this comparison. The video encoder may continue the residual quadtree process, comparing the result of applying the selected one of the first-order or level 0 transforms to the result of applying the four second order or level 1 N×N transforms. In this sense, the techniques may enable application of non-square transforms based on whether a non-square PU is associated with the current CU. Again, in practice, this transform selection process may be performed in a bottom up manner, starting from smallest-sized transform blocks and merging them if the larger-sized transform performs better, e.g., in terms of rate versus distortion.

In some implementations of the techniques described in this disclosure, the video encoder may perform this transform selection process in a slightly different manner, where a single root level transform of size 2N×2N is applied and the level 1 transform is of size 2N×N. The next level or level two transforms may then be specified as the four N×N transforms described above as being level 1 transforms. Thus, in these implementations, the non-square transforms may be specified as their own level one transforms rather than merging the non-square transforms with the root level transforms. These implementations may better match the selection process described above where the results of applying transforms of different levels are compared rather than the results of applying transforms from the same level.

Additionally, the techniques may limit how transforms are selected. For example, the transform selection process may be modified to only allow the video encoder to select transforms that are the same size as that of the PU size at the root level. In this example, for a PU of size N×2N, the video encoder may be configured to select an N×2N transform at the root level. For a PU of size 2N×2N, the video encoder may be configured to select a transform of size 2N×2N at the root level.

In some instances, the techniques may limit which transforms are applied. That is, a video encoder may apply non-square transforms based on the shape of the PU in some implementations of the techniques. For a PU of shape 2N×N, as one example, the video encoder may, as one example, only apply transforms of size 2N×N and not apply transforms of size N×2N during the selection process. By only applying a subset of possible non-square transforms during the selection process, video encoding performance may be improved as less processor cycles and time are consumed by forgoing application of some transforms. Reducing processing cycles may reduce power consumption, which may be beneficial when the video encoder is implemented in a mobile device, such as a so-called smart phone, or other power-conscious devices.

Moreover, the techniques may enable video coders to only permit application of non-square transforms to some color components, such as only to luma or only to chroma components, rather than both luma and chroma components. In yet other instances, the techniques may enable a video coder to selectively apply non-square transforms based on certain PU and/or CU sizes.

After selecting the transforms in the manner described above, the video encoder typically signals the selected transforms using syntax elements. Introduction of non-square transforms may require that the video encoder signal additional syntax elements. When there are two or more transforms available at the root level (referring to the exemplary implementation described above where the root level transforms include a 2N×2N transform and a 2N×N transforms), the video encoder may signal a transform selection (TS) flag to indicate which of the two or more root level transforms the video encoder selected. The video encoder may signal this TS flag after a so-called "split flag" indicating whether the root level was split into the four N×N portions. For example, the video encoder may set the TS flag to one upon selecting the 2N×N transform and otherwise set this TS flag to zero upon selecting the transform of size 2N×2N.

In some implementations of the techniques, the video encoder may signal the TS flag with other syntax elements, combining the TS flag with one or more of the split flag, the coded block flags for the luma (CbfY) transform block and chroma transform blocks (U, V are the two chroma color components, where these syntax elements for each of U and V are denoted "CbfU" and "CbfV"). To illustrate, assume a non-square transform is applied to a luma component block. For luma then, both 2N×2N and N×2N transforms are put in the transform tree root level (level 0) and N×N is specified at level 1. For a chroma transform block of size N×N (considering that in a common YUV video format of 4:2:0, the chroma block size is ½×½ of the luma block size), the root level (level 0) transform is size N×N and the level 1 transform is a transform of size N/2×N/2. Under these assumptions, the following information is sent as syntax to the video decoder:

1. Split flag; to indicate if root-level transform is adopted or smaller transform (split case) is used.
2. Transform selection flag TS. If root level transform is selected (split=1), TS is transmitted to signal the selection between 2N×2N (TS=0) and 2N×N (TS=1).
3. Cbf of luma. If Split=1 or (Split=0, TS=0), flag CbfY is transmitted to signal if there are non-zero Luma coefficients in the CU (CbfY=0, all Luma coefficients are 0; CbfY=1, at least one Luma coefficients is non-zero). If TS=1, CbfY0 and CbfY1 are transmitted to signal if there are non-zero coefficients in the first 2N×N transform block and the second block, respectively.
4. Cbf of chroma (U,V). Flag CbfU is transmitted to signal if there are non-zero U component coefficients in the CU. Flag CbfV is transmitted to signal if there are non-zero V component coefficients in the CU.

Transmitting each of these syntax elements separately may not fully exploit correlations among the different flags. As a result, the techniques may enable video encoders to employ a joint coding scheme as described below.

1. The video encoder first transmits the split flag, the CbfYY flag and the CbfUV flags using variable length coding (VLC), where the CbfYY and CbfUV flags are described below.
2. If Split=0, the TS flag is sent to indicate if the video encoder selected the non-square transform.
3. If TS=1, CbfYY is interpreted as CbfY0||CbfY1 (that is, CbfY0 refers to the CbfY flag for the first 2N×N or N×2N portion to which the transform is applied and CbfY1 refers to the CbfY flag for the second 2N×N or N×2N portion to which the transform is applied). In this case, if CbfYY=1, further information is transmitted to signal if CbfY0, CbfY1, or both of them are 1. If CbfYY=0, CBFY0=CBFY1=0.
4. If Split=1 or TS=0, CbfYY is interpreted as CbfY, which is described above.
5. CbfUV is defined to be (CbfU||CbfV), where when CbfUV=1, at least one of CbfU and CbfV is non-zero. If CbfUV=1, further information is transmitted to signal if CbfU, CbfV, or both of them are 1. If CbfUV=0, CBFU=CBFV=0.

In the above joint coding scheme, the CbfYY flags jointly signal CbfY0 and CbfY1 and the CbfUV flag jointly signals the CbfU and CbfV, providing for more efficient signaling in those instances where CbfYY equals zero and/or CbfUV equals zero (as signaling CbfYY in these instances requires one bit where two bits would be required to separately signal CbfY0 and CbfY1, and signaling CbfUV in these instances requires one bit where two would be required to separately signal CbfU and CbfV).

Meanwhile, the video encoder also quantizes transform coefficients generated from application of a non-square transform. These non-square transform coefficients are quantized, where the techniques of this disclosure may provide for a different quantization step size depending on whether the transform coefficients are square or non-square. Typically, quantization strength/step size are controlled by quantization parameters. The techniques may enable video encoders to use a new quantization parameter in determining this quantization step size, where this new quantization parameter may indicate whether the transform coefficients were generated through application of a square or non-square transform. In other words, the quantization parameters may be different for different transform step sizes and may be different between square transform and non-square transforms. In one example, assume a quantization parameter zero (QP0) is the basis QP for the current frame. A video encoder that implements this aspect of the techniques may use, as one example, a quantization parameter of QP0+3 for non-square transforms of size 2N×N and N×2N and a basis QP0 for all other transforms. Both the video encoder and decoder may utilize this aspect of the techniques.

After performing quantization, the video encoder typically scans the coefficients, which are typically expressed in terms of a two dimensional array, to generate a one dimensional ordering of these coefficients. Typically, the transform generates coefficients such that non-zero coefficients are located in the upper-left corner or the two dimensional array. The video encoder may scan these coefficients in a manner such that the non-zero coefficients are positioned next to one another the one dimensional ordering to facilitate run length coding of the zero-valued transform coefficients, thereby providing at least some amount of compression (as run-length coding typically involves expressing multiple zero-valued transform coefficients using a single number).

One aspect of the techniques described in this disclosure may specify a way by which non-square transform coefficients are to be scanned by a video encoder. A video encoder that implements this aspect of the techniques may perform this one-dimensional scan based on the shape of the two-dimensional block of transform coefficients. In one example, the video encoder may perform a form of scanning referred to as wavefront scanning (scanning from left-bottom to right-top or right-top to left-bottom), where the scanning always starts from the shorter edge.

The video encoder then performs a form of statistical lossless coding (which is often referred to by the misnomer "entropy coding") to encode the one-dimensional ordering of run-length encoded transform coefficients. This entropy encoder may perform the joint or compound encoding of the syntax elements described above as well as the encoding of the run-length encoded transform coefficients. A form of entropy encoding referred to as context adaptive binary arithmetic coding (CABAC) is often employed to encode the one-dimensional ordering of transform coefficients generated from square blocks of transform coefficients. Various aspects of the techniques described in this disclosure may enable a video encoder to perform CABAC with respect to the one-dimensional ordering of transform coefficients generated from non-square blocks of transform coefficients.

A video encoder that implements these entropy encoding aspects of the techniques may perform a form of CABAC that has been modified in three ways to accommodate non-square blocks of transform coefficients. The first modification may involve signaling of the last significant coefficients. The second modification may involve a modification to a so-called "significance map," while the third modification may involve a modification of a so-called "coefficient level."

For non-square blocks, in the signaling of the last significant coefficient, the video encoder may implement the first modification such that the context model used in performing CABAC depends on the length of the size of the coordinate being coded. In other words, the horizontal coordinate (X component of the last coefficient) has a context depending on the width of the block (and the bin of x being coded). Equivalently, the vertical coordinate (Y component) has a context set assigned depending on the height of the block.

For the significance map of non-square blocks, this disclosure proposes that transforms of size 2N×N and N×2N share the same one or more contexts for CABAC coding. By sharing contexts, the video encoder may reduce the total number of contexts. In order to enhance performance, the video encoder may not directly derive and share the context, but after transposing the coordinates and values of one of the rectangular shapes. For example, the coefficients of the 2N×N transform can be encoded directly, but the coefficients of the N×2N transformed are transposed before coding, meaning that coordinates X and Y and the width and height are swapped before coding. This aspect of the techniques described in this disclosure exploits the fact that the statistics of the 2N×N block are similar to the statistics of the N×2N block after being transposed.

As an example, when coding using CABAC, video coding devices may apply an inverse diagonal scan of coefficients to code syntax elements including syntax elements indicative of significance, level, and sign for a coefficient. For level coding, coefficients may be scanned in subsets of 16 coefficients. Context may be reinitialized for each subset based on a context neighborhood (or based on X and Y coordinates of a coefficient, in accordance with the techniques of this disclosure). To code the level information, the first two bins of the corresponding binarized symbol may be coded using CABAC, and the remaining bins may be coded using another bypass coding engine such as exponential Golomb coding. As the bins are coded by the CABAC engine, the context state is updated (where the context has a plurality of states defined by a probability model). The CABAC engine transitions to different states (values) of the context based on the probability model and the actual values being coded.

For the 8×4 and 4×8 blocks of transform coefficients, the video encoder may implement this aspect of the techniques to use a context for the significance map based on the position of the coefficient (similar to the 4×4 and 8×8 blocks in HEVC). In this implementation, sixteen contexts can be used for CABAC, being shared by two neighboring coefficients along the longer side. The following is one example illustrating how these shared contexts can be derived:

Let X and Y be the coordinates of a transform coefficient within a two-dimensional block of transform coefficients and let >> be the bit right shift operation and CtxNum be the context assigned for the block. The context for the 8×4 block can be derived as:

$$CtxNum = Y + (X >> 1)$$

As stated above, for the 4×8 block, the context can be derived as:

$$Swap(X, Y);$$

and $$CtxNum = Y + (X >> 1)$$

Where Swap(X,Y) can be implemented as:

```
Swap(X, Y) {
    temp=Y;
    Y=X;
    X=temp;
}
```

In other words, Swap(X,Y) may transpose the values for X and Y.

For larger blocks (16×4, 4×16 and above), the video encoder may implement these significant map aspects of the techniques to use a method similar to the one used in HEVC in which the context is based on the significance of neighboring coefficients. The proper transposing (or swapping) operation can be applied to one of the two shapes.

For the coefficient level coding, one HEVC proposal relies on the division of the block into sub-blocks of 4×4 and performs the coding within each sub-block sequentially. This type of processing is not possible when the block size can not fit in a 4×4 sub-block (i.e., when at least one of the sides of the rectangular is less than 4). To overcome that issue, the techniques described in this disclosure may enable a video encoder to execute a coding process in which the block is divided into a subset of n (e.g., n=sixteen) consecutive coefficients in scan order. This can be applied to all non-square block sizes or to only those that cannot contain 4×4 sub-blocks.

Additionally, the video encoder may implement some aspect of the techniques described in this disclosure to use a different set of probability contexts for the quad-tree Cbf of the non-square blocks, since they have different statistics than the square blocks.

Figure 4:
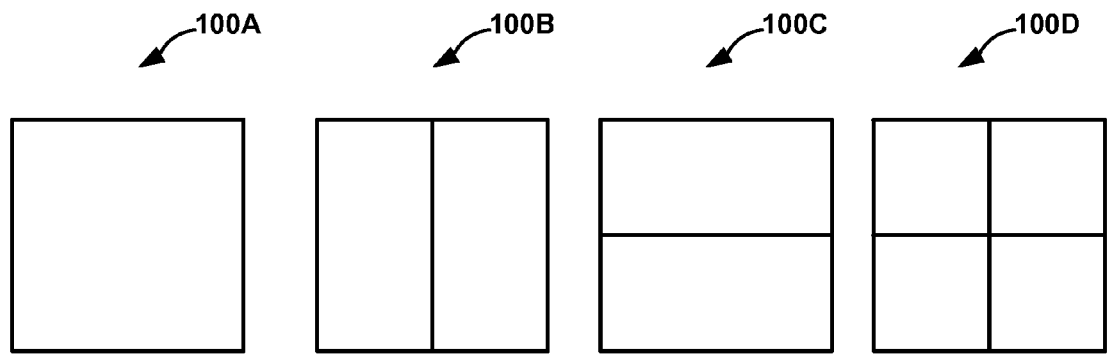
FIG. 4 is a conceptual diagram of prediction units (PUs) that each have a different size.
Figure 5:
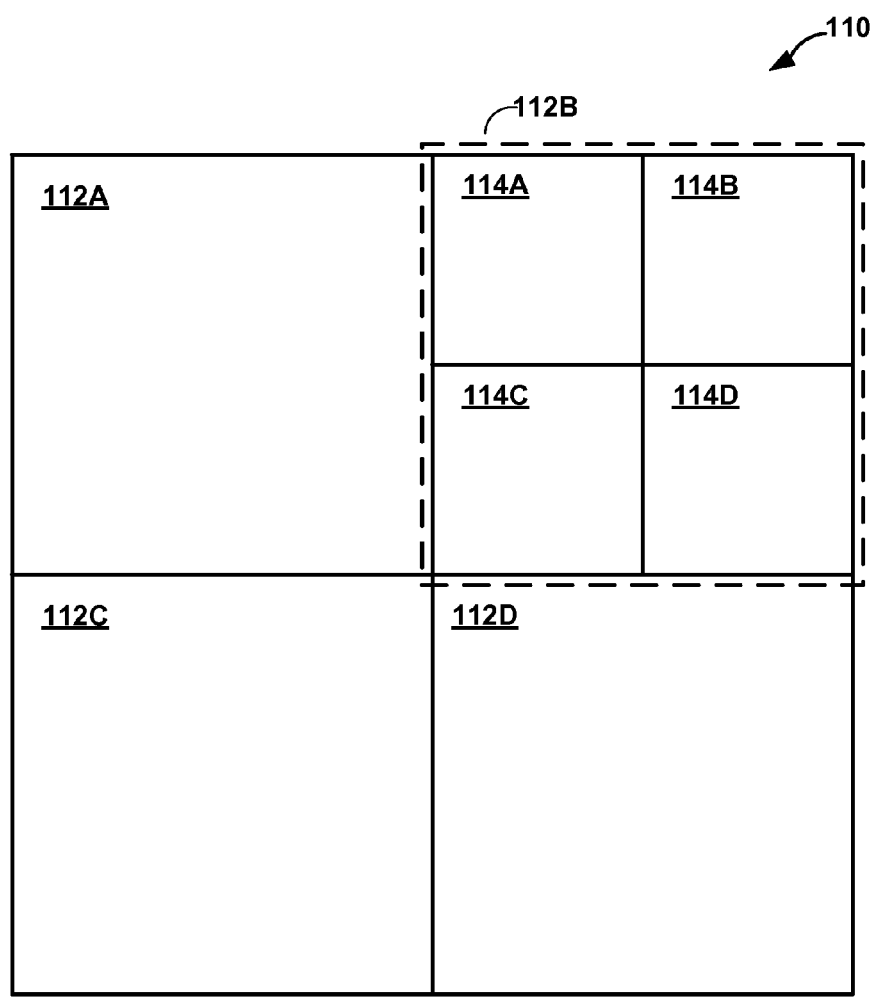
FIG. 5 is a conceptual diagram illustrating an example recursive quadtree transform structure.

While the techniques are generally described in this disclosure with respect to a video encoder, such as video encoder 20 shown in the example of FIGS. 4 and 5, many aspects of the techniques may be implemented by a video decoder, such as video decoder 30 shown in the examples of FIGS. 4 and 6. For example, the video decoder may implement an inverse version of the CABAC techniques described above to entropy decode the encoded video data output from the entropy encoder of the video encoder. The video decoder may also implement a form of inverse version of both the scanning and quantization aspects of the techniques described above to reconstruct the non-square block of transform coefficients. In addition, the video encoder may apply an inverse non-square transform to transform the transform coefficients from the frequency domain back to the spatial domain. The video decoder may also perform an inverse version of the syntax coding aspects of the techniques described above to parse the syntax elements from the bitstream and then decode the parsed syntax elements. The video decoder, however, typically does not implement the selection aspects of the techniques considering that the video encoder signals which of the transforms are selected via the syntax elements. Thus, while described above with respect to a video encoder, many aspects of the techniques may be performed by a video decoder, as described below in more detail.

In operation, the video decoder may implement the techniques to determine whether an inverse transform to be applied to transform coefficients representative of a portion of encoded video data is non-square based on transform information associated with the portion of the encoded video data, form the transform coefficients into a block of transform coefficients based on the determination of whether the transform unit is non-square and apply the inverse transform the block of transform coefficients to transform the block of transform coefficients into a block of residual video data.

FIG. 1 is a block diagram illustrating an example video encoding and decoding system 10 that may be configured to utilize the techniques described in this disclosure for coding video data using non-square transforms. As shown in FIG. 1, the system 10 includes a source device 12 that transmits encoded video to a destination device 14 via a communication channel 16. Encoded video data may also be stored on a storage medium 34 or a file server 36 and may be accessed by the destination device 14 as desired. When stored to a storage medium or file server, video encoder 20 may provide coded video data to another device, such as a network interface, a compact disc (CD), Blu-ray or digital video disc (DVD) burner or stamping facility device, or other devices, for storing the coded video data to the storage medium. Likewise, a device separate from video decoder 30, such as a network interface, CD or DVD reader, or the like, may retrieve coded video data from a storage medium and provided the retrieved data to video decoder 30.

The source device 12 and the destination device 14 may comprise any of a wide variety of devices, including desktop computers, notebook (i.e., laptop) computers, tablet computers, set-top boxes, telephone handsets such as so-called smartphones, televisions, cameras, display devices, digital media players, video gaming consoles, or the like. In many cases, such devices may be equipped for wireless communication. Hence, the communication channel 16 may comprise a wireless channel, a wired channel, or a combination of wireless and wired channels suitable for transmission of encoded video data. Similarly, the file server 36 may be accessed by the destination device 14 through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server.

Techniques for applying non-square transforms, in accordance with examples of this disclosure, may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, the system 10 may be configured to support one-way or two-way video transmission to support applications such as video streaming, video playback, video broadcasting, and/or video telephony.

In the example of FIG. 1, the source device 12 includes a video source 18, a video encoder 20, a modulator/demodulator 22 and a transmitter 24. In the source device 12, the video source 18 may include a source such as a video capture device, such as a video camera, a video archive containing previously captured video, a video feed interface to receive video from a video content provider, and/or a computer graphics system for generating computer graphics data as the source video, or a combination of such sources. As one example, if the video source 18 is a video camera, the source device 12 and the destination device 14 may form so-called camera phones or video phones. However, the techniques described in this disclosure may be applicable to video coding in general, and may be applied to wireless and/or wired applications, or applications in which encoded video data is stored on a local disk.

The captured, pre-captured, or computer-generated video may be encoded by the video encoder 20. The encoded video information may be modulated by the modem 22 according to a communication standard, such as a wireless communication protocol, and transmitted to the destination device 14 via the transmitter 24. The modem 22 may include various mixers, filters, amplifiers or other components designed for signal modulation. The transmitter 24 may include circuits designed for transmitting data, including amplifiers, filters, and one or more antennas.

The captured, pre-captured, or computer-generated video that is encoded by the video encoder 20 may also be stored onto a storage medium 34 or a file server 36 for later consumption. The storage medium 34 may include Blu-ray discs, DVDs, CD-ROMs, flash memory, or any other suitable digital storage media for storing encoded video. The encoded video stored on the storage medium 34 may then be accessed by the destination device 14 for decoding and playback.

The file server 36 may be any type of server capable of storing encoded video and transmitting that encoded video to the destination device 14. Example file servers include a web server (e.g., for a website), an FTP server, network attached storage (NAS) devices, a local disk drive, or any other type of device capable of storing encoded video data and transmitting it to a destination device. The transmission of encoded video data from the file server 36 may be a streaming transmission, a download transmission, or a combination of both. The file server 36 may be accessed by the destination device 14 through any standard data connection, including an Internet connection. This may include a wireless channel (e.g., a Wi-Fi connection), a wired connection (e.g., DSL, cable modem, Ethernet, USB, etc.), or a combination of both that is suitable for accessing encoded video data stored on a file server.

The destination device 14, in the example of FIG. 1, includes a receiver 26, a modem 28, a video decoder 30, and a display device 32. The receiver 26 of the destination device 14 receives information over the channel 16, and the modem 28 demodulates the information to produce a demodulated bitstream for the video decoder 30. The information communicated over the channel 16 may include a variety of syntax information generated by the video encoder 20 for use by the video decoder 30 in decoding video data. Such syntax, including the slice header syntax described above, may also be included with the encoded video data stored on the storage medium 34 or the file server 36. Each of the video encoder 20 and the video decoder 30 may form part of a respective encoder-decoder (CODEC) that is capable of encoding or decoding video data.

The display device 32 may be integrated with, or external to, the destination device 14. In some examples, the destination device 14 may include an integrated display device and also be configured to interface with an external display device. In other examples, the destination device 14 may be a display device. In general, the display device 32 displays the decoded video data to a user, and may comprise any of a variety of display devices such as a liquid crystal display (LCD), a plasma display, an organic light emitting diode (OLED) display, or another type of display device.

In the example of FIG. 1, the communication channel 16 may comprise any wireless or wired communication medium, such as a radio frequency (RF) spectrum or one or more physical transmission lines, or any combination of wireless and wired media. The communication channel 16 may form part of a packet-based network, such as a local area network, a wide-area network, or a global network such as the Internet. The communication channel 16 generally represents any suitable communication medium, or collection of different communication media, for transmitting video data from the source device 12 to the destination device 14, including any suitable combination of wired or wireless media. The communication channel 16 may include routers, switches, base stations, or any other equipment that may be useful to facilitate communication from the source device 12 to the destination device 14.

The video encoder 20 and the video decoder 30 may operate according to a video compression standard, such as the upcoming High Efficiency Video Coding (HEVC) standard that is presently under development, and may conform to the HEVC Test Model (HM). Alternatively, the video encoder 20 and the video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples include MPEG-2 and ITU-T H.263.

In accordance with the techniques of this disclosure, video encoder 20 and video decoder 30 may be configured to code video data using non-square transform blocks. Video encoder 20 and video decoder 30 may implement any or all of the techniques related to non-square transform blocks described in this disclosure, in any combination. In general, video encoder 20 and video decoder 30 represent examples of video coders configured to code information indicative of whether a transform unit of the video data is square or non-square, and code data of the transform unit based at least in part on whether the transform unit is square or non-square.

For example, video encoder 20 and video decoder 30 may be configured such that a root level (level 0) of a residual quadtree (RQT) data structure for a 2N×2N CU corresponds to either a 2N×2N TU or two N×2N (or 2N×N) TUs, and such that level 1 of the RQT data structure corresponds to N×N TUs. Alternatively, video encoder 20 and video decoder 30 may be configured such that a root level (level 0) of the RQT data structure corresponds to a 2N×2N TU, level 1 corresponds to 2N×N (or N×2N) TUs, and level 2 corresponds to N×N TUs. Coding information indicative of a level of an RQT data structure to which a transform unit corresponds may therefore represent an example of coding information indicative of whether the transform unit is square or non-square.

As another alternative, video encoder 20 and video decoder 30 may be configured such that TUs always have the same size as that of a corresponding PU at the root level (level 0) of the RQT data structure, or such that non-square TUs are only used with certain shapes of PUs, e.g., non-square PUs. Thus, coding information indicative of whether a transform unit is square or non-square may be based at least in part on whether a prediction unit corresponding to the transform unit is square or non-square. In some examples, coding information indicative of whether a prediction unit corresponding to a transform unit is square or non-square may itself correspond to coded information indicative of whether the transform unit is square or non-square.

In addition, or in the alternative, video encoder 20 and video decoder 30 may be configured to code data representative of sizes for one or more transform units. For example, video encoder 20 may select sizes for transform units and code values indicating the selected sizes, while video decoder 30 may decode and interpret received data to determine sizes for coded transform units. In this manner, video encoder 20 and video decoder 30 may apply the same transform unit sizes to TUs of a CU. In general, coding information indicative of a transform unit size may refer to video encoder 20 encoding such information or video decoder 30 decoding such information.

In some examples, coding information indicative of a transform unit size may include coding a split flag indicating whether TUs correspond to level 0 of an RQT or level 1 of the RQT (or higher levels of the RQT). Coding such information may further include coding information indicating sizes of TUs at each level. In some examples, level 0 corresponds to TUs of size 2N×2N for a corresponding 2N×2N CU. In other examples, level 0 may correspond to TUs of either of sizes 2N×2N or 2N×N (or N×2N), and further information may be coded to indicate which of the sizes at level 0 is selected when level 0 is selected. Thus, coding information indicative of a level in an RQT to which a transform unit corresponds, coding information indicative of a split flag (that is, whether a parent transform unit is split to form child transform units), and/or coding a transform selection flag represent examples of coding information indicative of whether a transform unit of the video data is square or non-square.

Additional information may be coded jointly with the information indicative of the sizes of the TUs, such as, for example, whether the TUs include non-zero transform coefficients, that is, whether the TUs are coded. Such information may include coded block flags for luminance and/or chrominance TUs. Thus, video encoder 20 and video decoder 30 may be configured to code information indicative of whether a transform unit is square or non-square based at least in part on whether the transform unit corresponds to a chrominance component or a luminance component.

Furthermore, in addition or in the alternative, video encoder 20 and video decoder 30 may be configured to code data representative of quantization parameters for various TUs. In particular, video encoder 20 and video decoder 30 may be configured to apply different quantization parameters to TUs based on whether the TUs are square or non-square. For example, video encoder 20 and video decoder 30 may code a value representative of a base quantization parameter $QP_0$ for a current picture. Moreover, video encoder 20 and video decoder 30 may be configured to determine offset values to be applied to the $QP_0$ value, where the offset values may be different for square vis-à-vis non-square TUs. For example, for non-square TUs, the offset value may be 3 (for $QP_0+3$) and for square TUs, the offset value may be 0 (for a QP equal to $QP_0$). Using a different QP value for square and non-square TUs may provide more flexibility, which may allow for achieving better coding performance The offset values may be fixed or signaled in, e.g., a sequence parameter set (SPS), a picture parameter set (PPS), an adaptation parameter set (APS), a slice header, a picture header, or other data structure. In this manner, video encoder 20 and video decoder 30 may be configured to determine a quantization parameter for a transform unit based on whether the transform unit is square or non-square.

Moreover, video encoder 20 and video decoder 30 may, additionally or alternatively, be configured to perform particular scan patterns for non-square TUs. For example, when a TU is non-square, the TU may generally be considered rectangular and non-square. As such, the TU may have one side that is longer than the other. For example, for an N×2N TU, the side of length 2N (e.g., top and bottom) is longer than the side of length N (e.g., left and right side). Likewise, for a 2N×N TU, the side of length 2N (e.g., left and right side) is longer than the side of length N (e.g., top and bottom). In accordance with the techniques of this disclosure, video encoder 20 and video decoder 30 may be configured to perform a scan based on which side of a non-square TU is longer. For example, for an N×2N TU, video encoder 20 and video decoder 30 may be configured to use wavefront scanning, in which the order is generally left-bottom to top-right, and may always start from the shorter edge (e.g., the left edge). In this manner, video encoder 20 and video decoder 30 may be configured to apply, when the transform unit is non-square, a scan pattern to transform coefficients of the transform unit that begins at a shorter edge of the transform unit.

Furthermore, video encoder 20 and video decoder 30 may be additionally or alternatively configured to perform modified CABAC entropy coding techniques to support non-square transform units. In particular, entropy coding techniques in support of non-square transform units may include signaling and coding information indicative of last significant coefficients (in scan order), significance maps, and coefficient levels. For non-square blocks, in signaling of the last significant coefficient, video encoder 20 and video decoder 30 may be configured such that a context model (e.g., for CABAC) depends on the length of the side of the coordinate being coded. For example, the horizontal coordinate (x-component of last significant coefficient) may have a CABAC context depending on the width of the block and the bin of x being coded. Likewise, the vertical coordinate (y-component) may have a context set assigned that depends on the height of the block.

Likewise, when coding the significance map of non-square blocks, 2N×N and N×2N may share the same contexts, which may reduce the total number of contexts compared with having different contexts for N×2N and 2N×N. Vertical oriented and horizontally oriented non-square TU's may use the same contexts, and same set of rules for selecting the contexts. However, the X and Y coordinates of a coefficient for one TU orientation may be used for context selection, whereas, the X and Y coordinates of a coefficient for the other orientation may be transposed in order to use the same context selection criteria. In particular, in order to enhance performance, video encoder 20 and video decoder 30 may transpose coordinates and values of rectangular shapes, rather than performing the sharing directly. For example, when coding a 2N×N transform unit, video encoder 20 and video decoder 30 may apply the contexts directly, but when coding an N×2N transform unit, video encoder 20 and video decoder 30 may transpose the X and Y coordinates and the width and height of the block, only for the purpose of selecting the contexts. In this manner, video encoder 20 and video decoder 30 may be configured to exploit similarities of statistics of 2N×N blocks and transposed N×2N blocks.

As an example, video encoder 20 and video decoder 30 may be configured to use context for coding significance maps based on positions of coefficients for 4×8 and 8×4 blocks, in a manner similar to 4×4 and 8×8 blocks in HEVC. Sixteen contexts may be used, being shared by two neighboring coefficients along the longer side. For example, let X and Y be the coordinates of a coefficient, let ">>" represent the right shift operation, and CtxNum be the context assigned for a current block. The context for the 8×4 block may be derived as:

$$CtxNum = Y + (X >> 1) \qquad (1)$$

For the 4×8 block, the context can be derived using formula (1) as well, but after swapping X and Y. For larger blocks, e.g., 16×4, 4×16, and above, video encoder 20 and video decoder 30 may be configured to use a method similar to that described in HEVC, in which the context is based on the significance of neighboring coefficients. The proper transposing (or swapping) operation can be applied to one of the two shapes.

For the coefficient level coding, current HEVC relies on the division of the block in sub-blocks of 4×4 and performs the coding within each sub-block sequentially. However, this type of processing is not compatible with block sizes that cannot fit in a 4×4 sub-block (such as when at least one of the sides of the rectangular is less than 4). Thus, video encoder 20 and video decoder 30 may perform a coding process in which the block is divided into n (e.g., n=16) consecutive coefficients in scan order. This can be applied to all non-rectangular block sizes or to only those that cannot contain 4×4 sub-blocks, in various examples. Video encoder 20 and video decoder 30 may further be configured to use a different set of probability contexts for the quadtree coded block flag (CBF) of the non-square blocks, versus the probability contexts for the quadtree CBF of the square blocks, since the non-square blocks may have different statistics than the square blocks.

In this manner, video encoder 20 and video decoder 30 may be configured to code data of a transform unit based at least in part on whether the transform unit is square or non-square. That is, video encoder 20 and video decoder 30 may be configured to select, when the transform unit is non-square, context for coding the data based on a location of a shorter edge of the transform unit.

Although not shown in FIG. 1, in some aspects, the video encoder 20 and the video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

In this manner, video encoder 20 and video decoder 30 represent examples of video coders configured to code information indicative of whether a transform unit of the video data is square or non-square, and code data of the transform unit based at least in part on whether the transform unit is square or non-square. For example, to code the data of the transform unit, video encoder 20 may be configured to calculate residual data for at least a portion of a coding unit, transform the residual data to produce transform coefficients, quantize the transform coefficients, and encode the quantized transform coefficients of the transform unit based on whether the transform unit is square or non-square. In addition, to code the information indicative of whether the transform unit is square or non-square, video encoder 20 may be configured to encode the information indicative of whether the transform unit is square or non-square.

Likewise, to code the information indicative of whether the transform unit of the video data is square or non-square, video decoder 30 may be configured to decode the information indicative of whether the transform unit of the video data is square or non-square. In addition, to code the data of the transform unit, video decoder 30 may be configured to decode quantized transform coefficients of the transform unit based on whether the transform unit is square or non-square, inverse quantize the quantized transform coefficients, and inverse transform the transform coefficients to produce residual data for at least a portion of a coding unit corresponding to the transform unit.

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of the video encoder 20 and the video decoder 30 may be included in one or more encoders or decoders, either of which may be integrated as part of a combined encoder/decoder (CODEC) in a respective device.

The video encoder 20 may implement any or all of the techniques of this disclosure for coding video data using non-square transforms. Likewise, the video decoder 30 may implement any or all of these techniques for coding video data using non-square transforms. A video coder, as described in this disclosure, may refer to a video encoder or a video decoder. Similarly, a video coding unit may refer to a video encoder or a video decoder. Likewise, video coding may refer to video encoding or video decoding.

Figure 2:
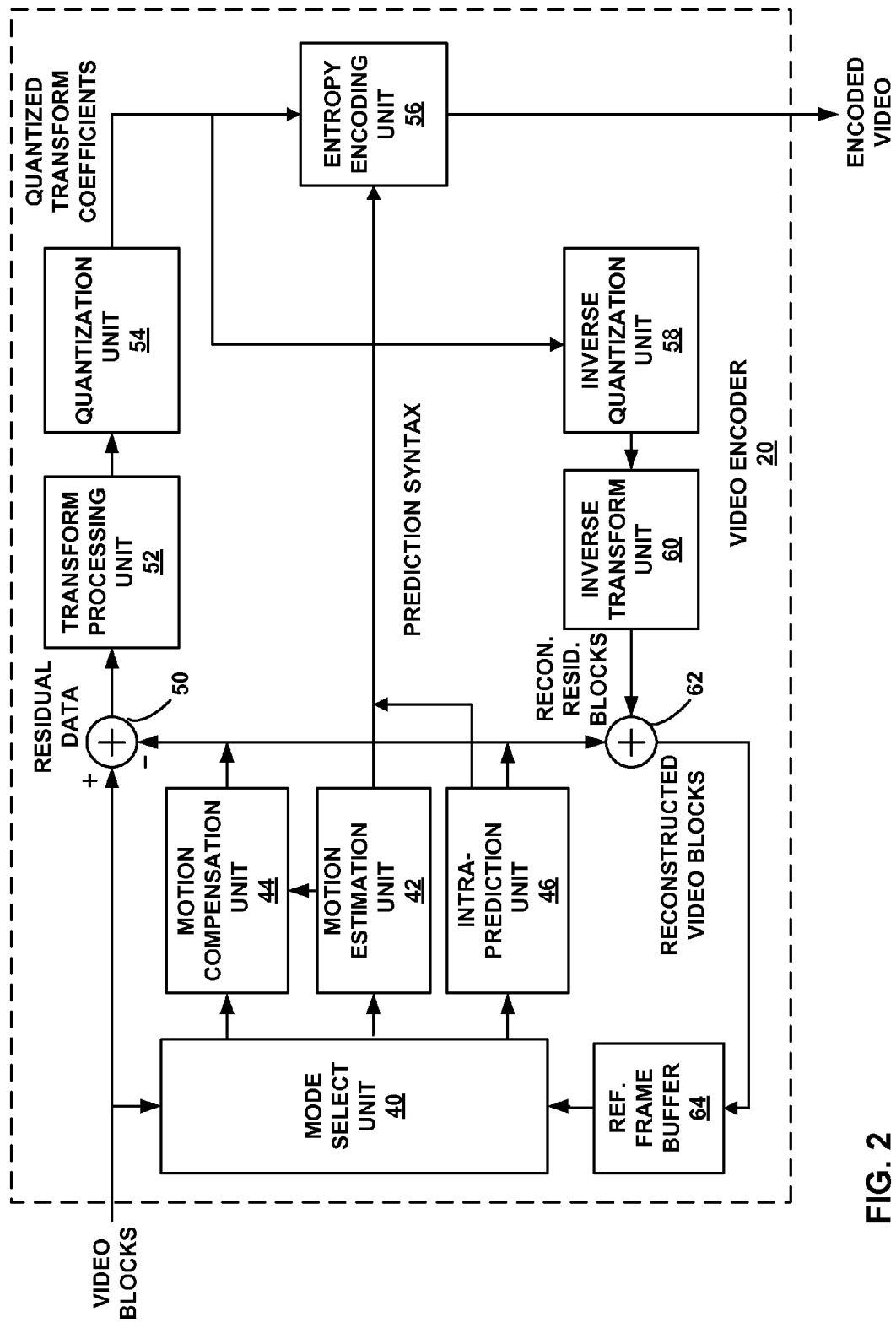
FIG. 2 is a block diagram illustrating an example video encoder.

FIG. 2 is a block diagram illustrating an example of a video encoder 20 that may use techniques for selecting merge candidates in a motion vector prediction process as described in this disclosure. The video encoder 20 will be described in the context of HEVC coding for purposes of illustration, but without limitation of this disclosure as to other coding standards or methods. The video encoder 20 may perform intra- and inter-coding of CUs within video frames. Intra-coding relies on spatial prediction to reduce or remove spatial redundancy in video data within a given video frame. Inter-coding relies on temporal prediction to reduce or remove temporal redundancy between a current frame and previously coded frames of a video sequence. Intra-mode (I-mode) may refer to any of several spatial-based video compression modes. Inter-modes such as uni-directional prediction (P-mode) or bi-directional prediction (B-mode) may refer to any of several temporal-based video compression modes.

As shown in FIG. 2, the video encoder 20 receives a current video block within a video frame to be encoded. In the example of FIG. 2, the video encoder 20 includes a motion compensation unit 44, a motion estimation unit 42, an intra-prediction unit 46, a reference frame buffer 64, a summer 50, a transform processing unit 52, a quantization unit 54, and an entropy encoding unit 56. Transform processing unit 52 illustrated in FIG. 2 is the unit that applies the actual transform or combinations of transforms to a block of residual data, and is not to be confused with block of transform coefficients, which also may be referred to as a transform unit (TU) of a CU. Transform processing unit 52 may apply non-square transforms in accordance with the techniques described in this disclosure. For video block reconstruction, video encoder 20 also includes an inverse quantization unit 58, an inverse transform unit 60, and a summer 62. A deblocking filter (not shown in FIG. 1) may also be included to filter block boundaries to remove blockiness artifacts from reconstructed video. If desired, the deblocking filter would typically filter the output of the summer 62.

During the encoding process, the video encoder 20 receives a video frame or slice to be coded. The frame or slice may be divided into multiple video blocks, e.g., largest coding units (LCUs). Motion estimation unit 42 and motion compensation unit 44 perform inter-predictive coding of the received video block relative to one or more blocks in one or more reference frames to provide temporal compression. Intra-prediction unit 46 may perform intra-predictive coding of the received video block relative to one or more neighboring blocks in the same frame or slice as the block to be coded to provide spatial compression.

Mode select unit 40 may select one of the coding modes, intra or inter, e.g., based on error (which may refer to distortion) results for each mode, and provides the resulting intra- or inter-predicted block (e.g., a prediction unit (PU)) to the summer 50 to generate residual block data and to the summer 62 to reconstruct the encoded block for use in a reference frame. Mode select unit 40 may also implement the transform selection aspects of the techniques of this disclosure described above. Summer 62 combines the predicted block with inverse quantized, inverse transformed data from inverse transform unit 60 for the block to reconstruct the encoded block, as described in greater detail below. Some video frames may be designated as I-frames, where all blocks in an I-frame are encoded in an intra-prediction mode. In some cases, intra-prediction unit 46 may perform intra-prediction encoding of a block in a P- or B-frame, e.g., when motion search performed by motion estimation unit 42 does not result in a sufficient prediction of the block. Furthermore, mode select unit 40 may select a manner in which to partition a leaf-node coding unit into one or more PUs, which may be non-square. For example, mode select unit 40 may select N×2N or 2N×N PUs for a 2N×2N CU, N/2×2N or 2N×N/2 PUs in the case of SDIP, or 2N×nU, 2N×nD, nL×2N, or nR×2N PUs for asymmetric motion partitioning or asymmetric SDIP.

Motion estimation unit 42 and motion compensation unit 44 may be highly integrated, but are illustrated separately for conceptual purposes. Motion estimation (or motion search) is the process of generating motion vectors, which estimate motion for video blocks. A motion vector, for example, may indicate the displacement of a prediction unit in a current frame relative to a reference sample, i.e., reference block, of a reference frame. Motion estimation unit 42 calculates a motion vector for a prediction unit of an inter-coded frame by comparing the prediction unit to reference samples of a reference frame stored in reference frame buffer 64. A reference sample may be a block that is found to closely match the portion of the CU including the PU being coded in terms of pixel difference, which may be determined by sum of absolute difference (SAD), sum of squared difference (SSD), or other difference metrics. The reference sample may occur anywhere within a reference frame or reference slice, and not necessarily at a block (e.g., coding unit) boundary of the reference frame or slice. In some examples, the reference sample may occur at a fractional pixel position, which may be interpolated.

Motion estimation unit 42 sends the calculated motion vector to entropy encoding unit 56 and motion compensation unit 44. In particular, motion estimation unit 42 may utilize the above-described merge candidates to signal the motion vector according to a merge mode (i.e., signal the index of a neighbor block from which to copy a motion vector). The portion of the reference frame identified by a motion vector may be referred to as a reference sample. Motion compensation unit 44 may calculate a prediction value for a prediction unit of a current CU, e.g., by retrieving the reference sample identified by a motion vector for the PU.

Intra-prediction unit 46 may intra-predict the received block, as an alternative to inter-prediction performed by motion estimation unit 42 and motion compensation unit 44. Intra-prediction unit 46 may predict the received block relative to spatially neighboring, previously coded blocks, e.g., blocks above, above and to the right, above and to the left, or to the left of the current block, assuming a left-to-right, top-to-bottom encoding order for blocks. Intra-prediction unit 46 may be configured with a variety of different intra-prediction modes. For example, intra-prediction unit 46 may be configured with a certain number of directional prediction modes, e.g., thirty-five directional prediction modes, based on the size of the CU being encoded.

Intra-prediction unit 46 may select an intra-prediction mode by, for example, calculating error values for various intra-prediction modes and selecting a mode that yields the lowest error value. Directional prediction modes may include functions for combining values of spatially neighboring pixels and applying the combined values to one or more pixel positions in a PU. Once values for all pixel positions in the PU have been calculated, intra-prediction unit 46 may calculate an error value for the prediction mode based on pixel differences between the PU and the received block to be encoded. Intra-prediction unit 46 may continue testing intra-prediction modes until an intra-prediction mode that yields an acceptable error value is discovered. Intra-prediction unit 46 may then send the PU to the summer 50.

The video encoder 20 forms a residual block by subtracting the prediction data calculated by motion compensation unit 44 or intra-prediction unit 46 from the original video block being coded. The summer 50 represents the component or components that perform this subtraction operation. The residual block may correspond to a two-dimensional matrix of pixel difference values, where the number of values in the residual block is the same as the number of pixels in the PU corresponding to the residual block. The values in the residual block may correspond to the differences, i.e., error, between values of co-located pixels in the PU and in the original block to be coded. The differences may be chroma or luma differences depending on the type of block that is coded.

Transform processing unit 52 may form one or more transform units (TUs) from the residual block. Transform processing unit 52 selects a transform from among a plurality of transforms, which may include non-square transforms of size 2N×N, N×2N, N×M or M×N in accordance with the techniques described above. Transform processing unit 52 then applies the selected transform to the TU, producing a video block comprising a two-dimensional array of transform coefficients. In this manner, transform processing unit 52 may use TUs having the same size as corresponding PUs, or which have smaller sizes than corresponding PUs. Of course, transform processing unit 52 could also use TUs having sizes larger than PUs, but in general, it may be undesirable to use TUs that are larger than corresponding PUs.

In particular, in accordance with the techniques of this disclosure, transform processing unit 52 may code information indicative of whether a transform unit of the video data is square or non-square, and code data of the transform unit based at least in part on whether the transform unit is square or non-square. That is, in some examples, transform processing unit 52 (or mode select unit 40, in other examples) may determine whether to form square or non-square transform units for a leaf-node coding unit. Alternatively, mode select unit 40 may determine whether to form square or non-square transform units based on coding results of various coding passes, causing transform processing unit 52 to use either square or non-square transforms in each pass, and select sizes and shapes for the transform units based on the results of these various coding passes, e.g., in terms of distortion, or in terms of a rate-distortion metric.

In some examples, video encoder 20 (e.g., mode select unit 40 and/or transform processing unit 52 of video encoder 20) may analyze additional or alternative criteria when determining whether to use square or non-square transform units. For example, video encoder 20 may be configured such that only square or only non-square transform units are available in certain scenarios, e.g., for certain components (chrominance or luminance components), based on shapes of PUs of the current leaf-node CU, based on a size of the current leaf-node CU, or a combination of such criteria.

Moreover, after selecting a shape of TU(s) for the current leaf-node CU, video encoder 20 may code data indicative of the selected shape. For example, video encoder 20 may be configured to code data representative of a level of an RQT to which TU(s) of the current leaf-node CU correspond. In some examples, shapes of PUs may dictate shapes of corresponding TUs, and thus, coding information indicative of the shapes of the PUs may also indicate shapes of the corresponding TUs. Likewise, coding information indicating whether the TU(s) correspond to a chrominance or luminance component may also be indicative of whether the TU(s) are (or can be) square or non-square. For example, video coding devices may be configured to select between square or non-square TUs for luminance components, but be configured to use only square TUs for chrominance components.

Transform processing unit 52 may form TUs of the selected size, such that the TUs include residual data received from summer 50, and apply a transform to the residual data to transform the data from the pixel domain to the frequency domain. Such transformed data may be referred to as transform coefficients. Transform processing unit 52 may send the resulting transform coefficients to quantization unit 54. Quantization unit 54 may then quantize the transform coefficients. In some examples, quantization unit 54 may be configured to determine a quantization parameter based on whether the TUs are square or non-square. For example, quantization unit 54 may offset the quantization parameter by a certain amount based on whether the TUs are square or non-square. As discussed above, quantization unit 54 may apply an offset value to a $QP_0$ value, where the $QP_0$ value is a quantization parameter signaled for a current frame or slice including the TU, and the offset may be based on whether the TU is square or non-square. For example, different offsets to a $QP_0$ value may be used for square and non-square TU's. In some cases, no offset to the $QP_0$ value may be used for square TU's and a selected offset to the $QP_0$ value may be used for a non-square TU.

Entropy encoding unit 56 may scan and entropy code the quantized transform coefficients in the matrix according to a scanning pattern. In some examples, entropy encoding unit 56 may perform a conventional scan, e.g., per the techniques of HEVC or other relevant coding standards. In some examples, in accordance with the techniques of this disclosure, entropy encoding unit 56 may scan quantized transform coefficients of a non-square transform unit using a scan pattern that starts at a shorter edge of the transform unit in a corner joining the shorter edge to the longer edge in the direction of the scan pattern. For example, entropy encoding unit 56 may begin the scan at a left edge of a TU having a width longer than the height where the left edge meets the top edge. As another example, entropy encoding unit 56 may begin the scan at a top edge of a TU having a height longer than the width where the top edge meets the left edge.

Entropy encoding unit 56 may also be configured to code quantized transform coefficients of the TU based on whether the TU is square or non-square. In general, entropy coding unit 56 may encode, for each coefficient, data (that is, syntax elements) indicating whether the coefficient has an absolute value greater than zero (that is, whether the coefficient is significant), whether the coefficient is the last significant coefficient in scan order, whether the coefficient has a value that is positive or negative, whether the absolute value of the coefficient is greater than one, whether the absolute value of the coefficient is greater than two, and a value of the "level" of the coefficient (that is, the absolute value of the coefficient, which may be coded as the absolute value of the coefficient minus three). Entropy encoding unit 56 may skip encoding of syntax elements whose values can be inferred, e.g., skipping encoding of data indicating whether the coefficient has an absolute value greater than two when the coefficient is not significant, that is, does not have an absolute value greater than zero.

In some examples, entropy encoding unit 56 may encode the coefficients using context-adaptive binary arithmetic coding (CABAC). In general, when performing CABAC, entropy encoding unit 56 selects a set of context sets, as well as an initialization value of the set, and transitions between the states as coding progresses. To perform CABAC, entropy encoding unit 56 may select a context model to apply to a certain context to encode symbols to be transmitted in accordance with the CABAC techniques described in this disclosure. The context may relate to, for example, whether neighboring values are non-zero or not and other criteria and/or data described above with respect to the CABAC aspects of the techniques described above. Entropy encoding unit 56 may also entropy encode syntax elements, such as the signal representative of the selected transform. Following the entropy coding by entropy encoding unit 56, the resulting encoded video may be transmitted to another device, such as the video decoder 30, or archived for later transmission or retrieval.

The TU may be considered a two-dimensional matrix of transform coefficients, such that each of the transform coefficients can be identified in the TU using the pair value (X,Y), where X corresponds to a horizontal coordinate and Y corresponds to a vertical coordinate within the TU. When coding syntax elements (X,Y) for a last significant coefficient (that is, the syntax elements indicative of the X coordinate of the last significant coefficient and the Y coordinate of the last significant coefficient), entropy encoding unit 56 may select a context set based on a length of the side of the coordinate being coded. That is, when coding the X component, entropy encoding unit 56 may select a context based on a width of the TU, whereas when coding the Y component, entropy encoding unit 56 may select a context based on a height of the TU.

When coding the significance map for the TU (that is, a set of values indicating whether each respective coefficient is significant (non-zero) or not), entropy encoding unit 56 may essentially use the same contexts for TUs having heights greater than widths and widths greater than heights. To do so, entropy encoding unit 56 may code some TUs using direct context determination, and may code other TUs by transposing the coordinates of the TUs and then determining contexts. For example, for relatively horizontal TUs (having widths longer than heights), entropy encoding unit 56 may apply direct context determination, where a context is selected for a coefficient based on the x coordinate and y coordinate of the coefficient, and for relatively vertical TUs (having heights longer than widths), entropy encoding unit 56 may transpose the vertical TUs and then determine contexts, where a context is selected for a coefficient based on transposed x and y coordinates. In particular, the x and y coordinates of each coefficient in a relatively vertical TU are transposed such that the original y coordinate is used as a transposed x coordinate and the original x coordinate is used as a transposed y coordinate for purposes of context selection. The transposed coordinates [(x,y)->(y, x)] for each of the coefficients in the relatively vertical TU are then used to select a context for the respective coefficients in the same manner in which x and y coordinates are used for a relatively horizontal TU.

As an example, entropy encoding unit 56 may encode coefficients of 8×4 and 4×8 TUs using the CABAC contexts for significance map coding based on the position of the coefficients, similar to 4×4 and 8×8 blocks as described in HEVC. Entropy encoding unit 56 may be configured to determine the context as described with respect to formula (1) above. That is, entropy encoding unit 56 may derive the context for each coefficient of an 8×4 block as CtxNum=Y+ (X>>1), where X and Y are the horizontal and vertical coordinates of the respective coefficient for which the context is determined. That is, an identifier of a context for coding a syntax element of a coefficient, such as a significant coefficient flag, may be based on an X-coordinate and a Y-coordinate of the coefficient. Likewise, entropy encoding unit 56 may derive the context for each coefficient of a 4×8 block by first swapping X and Y coordinates of the respective coefficient, and then performing CtxNum=Y+(X>>1). For coefficient level coding, entropy encoding unit 56 may divide the TU into 16 consecutive coefficients in scan order. When coding coded block flags of non-square blocks, entropy encoding unit 56 may use a different set of contexts, e.g., contexts specifically corresponding to coded block flags based on X and Y coordinates of the corresponding coefficient.

In some cases, entropy encoding unit 56 or another unit of the video encoder 20 may be configured to perform other coding functions, in addition to entropy coding. For example, entropy encoding unit 56 may be configured to determine coded block pattern (CBP) values for CU's and PU's. Also, in some cases, entropy encoding unit 56 may perform run length coding of coefficients.

The inverse quantization unit 58 and the inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame buffer 64. Motion compensation unit 44 may also apply one or more interpolation filters to the reconstructed residual block to calculate sub-integer pixel values for use in motion estimation. The summer 62 adds the reconstructed residual block to the motion compensated prediction block produced by motion compensation unit 44 to produce a reconstructed video block for storage in reference frame buffer 64.

Mode select unit 40 may then analyze the result of applying the transforms, and select which of the transforms should be signaled in the bitstream, often performing a rate-distortion analysis or optimization and comparing the various transforms to one another in accordance with the transform selection aspects of the techniques describe above. Mode select unit 40 may implement the recursive selection process described above to generate the residual quadtree transform structure, which mode select unit 40 may pass to entropy encoding unit 56 in the form of the above described syntax elements.

In this manner, video encoder 20 represents an example of a video coder configured to code information indicative of whether a transform unit of the video data is square or non-square, and code data of the transform unit based at least in part on whether the transform unit is square or non-square. In particular, to code the data of the transform unit, video encoder 20 may be configured to calculate residual data for at least a portion of a coding unit, transform the residual data to produce transform coefficients, quantize the transform coefficients, and encode the quantized transform coefficients of the transform unit based on whether the transform unit is square or non-square, and to code the information indicative of whether the transform unit is square or non-square, video encoder 20 may be configured to encode the information indicative of whether the transform unit is square or non-square. In addition, video encoder 20 may compare results of coding the coding unit using square transform units to results of coding the coding unit using non-square transform units, and select either square transform units or non-square transform units based on the comparison.

Figure 3:
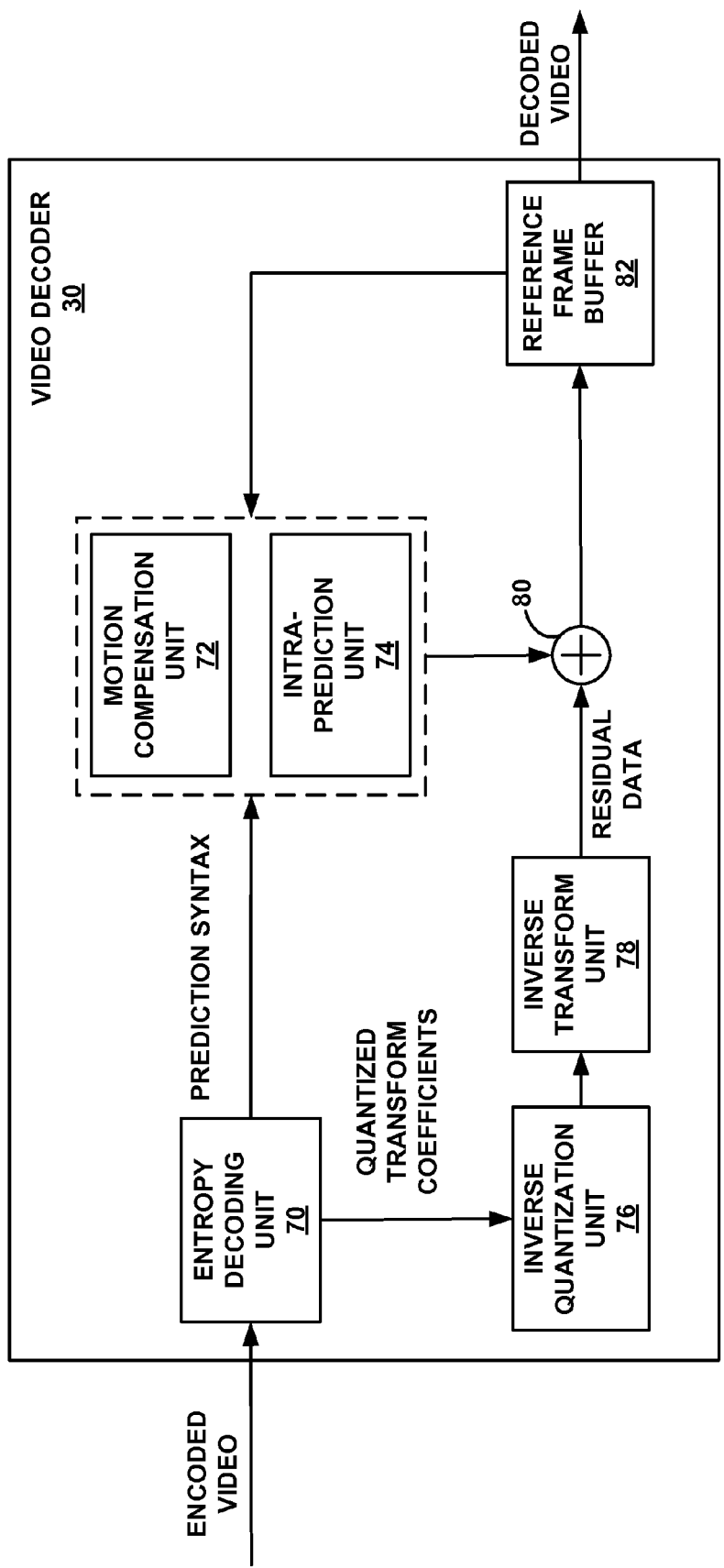
FIG. 3 is a block diagram illustrating an example video decoder.

FIG. 3 is a block diagram illustrating an example of a video decoder 30, which decodes an encoded video sequence. In the example of FIG. 3, the video decoder 30 includes an entropy decoding unit 70, a motion compensation unit 72, an intra-prediction unit 74, an inverse quantization unit 76, an inverse transformation unit 78, a reference frame buffer 82 and a summer 80. The video decoder 30 may, in some examples, perform a decoding pass generally reciprocal to the encoding pass described with respect to the video encoder 20 (see FIG. 2).

The entropy decoding unit 70 performs an entropy decoding process on the encoded bitstream to retrieve a one-dimensional array of transform coefficients. The entropy decoding process used depends on the entropy coding used by the video encoder 20 (e.g., CABAC, CAVLC, etc.). The entropy coding process used by the encoder may be signaled in the encoded bitstream or may be a predetermined process. Generally, the entropy decoding unit 70 implements entropy decoding aspects of the techniques described above in a manner reciprocal to those described above with respect to entropy encoding unit 56. The entropy decoding unit 70 may also implement syntax decoding aspects of the techniques that are generally reciprocal to the syntax encoding aspect of the techniques described above to decode the syntax element specified in the bitstream (which is represented as "encoded video" in the examples of FIGS. 2 and 3).

In some examples, the entropy decoding unit 70 (or the inverse quantization unit 76) may scan the received values using a scan mirroring the scanning mode used by entropy encoding unit 56 (or quantization unit 54) of the video encoder 20. In this sense, the entropy decoding unit 70 may implement the scanning aspects of the techniques in a manner reciprocal to the scanning aspects of the techniques described above with respect to entropy encoding unit 56. Although the scanning of coefficients may be performed in the inverse quantization unit 76, scanning will be described for purposes of illustration as being performed by the entropy decoding unit 70. In addition, although shown as separate functional units for ease of illustration, the structure and functionality of the entropy decoding unit 70, the inverse quantization unit 76, and other units of the video decoder 30 may be highly integrated with one another.

The inverse quantization unit 76 inverse quantizes, i.e., de-quantizes, the quantized transform coefficients provided in the bitstream and decoded by the entropy decoding unit 70. In this way, inverse quantization unit 76 may implement inverse quantization aspect of the techniques described herein that are generally reciprocal to the quantization aspects of the techniques described above with respect to quantization unit 54. Moreover, inverse quantization unit 76 may implement substantially the same aspects of the techniques as implemented by inverse quantization unit 58 of video encoder 20. The inverse quantization process may include a conventional process, e.g., similar to the processes proposed for HEVC or defined by the H.264 decoding standard. The inverse quantization process may include use of a quantization parameter QP calculated by video encoder 20 for the CU to determine a degree of quantization and, likewise, a degree of inverse quantization that should be applied. The inverse quantization unit 76 may inverse quantize the transform coefficients either before or after the coefficients are converted from a one-dimensional array to a two-dimensional array.

The inverse transform unit 78 applies an inverse transform to the inverse quantized transform coefficients. In some examples, the inverse transform unit 78 may determine an inverse transform based on signaling from the video encoder 20, or by inferring the transform from one or more coding characteristics such as block size, coding mode, or the like. In some examples, the inverse transform unit 78 may determine a transform to apply to the current block based on a signaled transform at the root node of a quadtree for an LCU including the current block. Alternatively, the transform may be signaled at the root of a TU quadtree for a leaf-node CU in the LCU quadtree. In some examples, the inverse transform unit 78 may apply a cascaded inverse transform, in which inverse transform unit 78 applies two or more inverse transforms to the transform coefficients of the current block being decoded. The inverse transform unit 78 may apply one or more non-square inverse transforms in a manner that is generally reciprocal to the application of non-square transforms described above with respect to transform processing unit 52.

In this way, inverse transform unit 78 may implement the non-square transform aspect of the techniques described herein that are generally reciprocal to the non-square transform aspects of the techniques described above with respect to transform processing unit 52. Moreover, inverse transform unit 78 may implement substantially the same aspects of the techniques as implemented by inverse transform unit 60 of video encoder 20.

The intra-prediction unit 74 may generate prediction data for a current block of a current frame based on a signaled intra-prediction mode and data from previously decoded blocks of the current frame.

On the other hand, motion compensation unit 44 may receive syntax data indicative of motion information, such as a motion vector, reference frame index, and motion direction. Based on the retrieved motion prediction direction, reference frame index, and calculated current motion vector (e.g., a motion vector copied from a neighboring block according to a merge mode), the motion compensation unit produces a motion compensated block for the current portion for inter-prediction. These motion compensated blocks essentially recreate the predictive block used to produce the residual data.

The motion compensation unit 72 may produce the motion compensated blocks, possibly performing interpolation based on interpolation filters. Identifiers for interpolation filters to be used for motion estimation with sub-pixel precision may be included in the syntax elements. The motion compensation unit 72 may use interpolation filters as used by the video encoder 20 during encoding of the video block to calculate interpolated values for sub-integer pixels of a reference block. The motion compensation unit 72 may determine the interpolation filters used by the video encoder 20 according to received syntax information and use the interpolation filters to produce predictive blocks.

Additionally, the motion compensation unit 72 and the intra-prediction unit 74, in an HEVC example, may use some of the syntax information (e.g., provided by a quadtree) to determine sizes of LCUs used to encode frame(s) of the encoded video sequence. The motion compensation unit 72 and the intra-prediction unit 74 may also use syntax information to determine split information that describes how each CU of a frame of the encoded video sequence is split (and likewise, how sub-CUs are split). The syntax information may also include modes indicating how each split is encoded (e.g., intra- or inter-prediction, and for intra-prediction an intra-prediction encoding mode), one or more reference frames (and/or reference lists containing identifiers for the reference frames) for each inter-encoded PU, and other information to decode the encoded video sequence.

The summer 80 combines the residual blocks with the corresponding prediction blocks generated by the motion compensation unit 72 or the intra-prediction unit 74 to form decoded blocks. Video decoder 30 may also include a de-blocking unit that applies a de-blocking filter. This filter may be applied to filter the decoded blocks in order to remove blockiness artifacts. The decoded video blocks are then stored in the reference frame buffer 82, which provides reference blocks for subsequent motion compensation and also produces decoded video for presentation on a display device (such as the display device 32 of FIG. 1).

In this manner, video decoder 30 represents an example of a video coder configured to code information indicative of whether a transform unit of the video data is square or non-square, and code data of the transform unit based at least in part on whether the transform unit is square or non-square. In particular, to code the information indicative of whether the transform unit of the video data is square or non-square, video decoder 30 may be configured to decode the information indicative of whether the transform unit of the video data is square or non-square, and to code the data of the transform unit, video decoder 30 may be configured to decode quantized transform coefficients of the transform unit based on whether the transform unit is square or non-square, inverse quantize the quantized transform coefficients, and inverse transform the transform coefficients to produce residual data for at least a portion of a coding unit corresponding to the transform unit.

FIG. 4 is a conceptual diagram of coding units (CUs) 100A-100D being split into PUs having different sizes. A CU of size 2N×2N may be split according to one of the partitioning strategies of CUs 100A-100D. CU 100A includes a PU of size 2N×2N, and thus, the PU of CU 100A is the same size as CU 100A. CU 100B is split into two PUs of size N×2N. CU 100C is split into two PUs of size 2N×N. CU 100D is split into four PUs of size N×N. In each of these examples, the CUs are assumed to be leaf-node CUs.

In accordance with the techniques of this disclosure, TUs for CUs 100A-100D may be square or non-square. In some examples, TUs for CUs 100B and 100C may be assumed to be non-square, while TUs for CUs 100A and 100D may be assumed to be square, e.g., when video encoder 20 and video decoder 30 are configured to use TUs having the same size as corresponding PUs. In other examples, video encoder 20 and video decoder 30 may be configured to only use square TUs for CUs 100A and 100D, but determine whether to use square or non-square TUs for CUs 100B and 100C.

FIG. 5 is a conceptual diagram illustrating an example residual quadtree transform structure 110. In the example of FIG. 5, structure 110 includes a root level, which is the outer box that is of size 2N×2N, that has been divided into four N×N sub-blocks 112A, 112B, 112C, and 112D. Sub-block 112B of structure 110 has been further sub-divided into four sub-portions of size N/2×N/2, meaning that the transforms of size N/2×N/2 may have been determined to produce a better result than the result achieved for applying a transform of size N×N to sub-portion 112B. With respect to sub-portions 112A, 112C, and 112D, further sub-dividing of these portions into four sub-portions of size N/2×N/2 may not have produced a better result, as the video encoder elected the transform of size N×N over the transform of size N/2×N/2 when applied to sub-portions of portions 112A, 112C, and 112D. In addition, the transform of size 2N×2N applied at the root level did not produce a better result in the example of FIG. 5 considering that the video encoder selected the transforms of size N×N applied to sub-portions 112A, 112B, 112C, and 112D.

Although the example of RQT structure 110 illustrates square-shaped TUs in the example of FIG. 5, an RQT structure may also include non-square-shaped TUs, in accordance with the techniques of this disclosure. Examples of such RQT structures are described with respect to FIGS. 8 and 9 below.

Figure 6A:
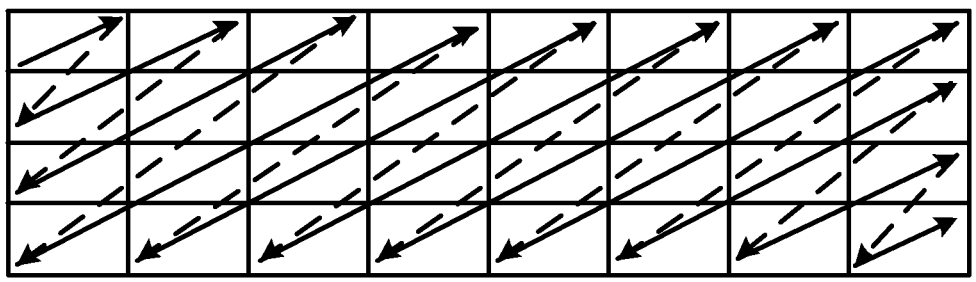
FIGS. 6A and 6B are diagrams illustrating wavefront scanning in accordance with an aspect of the techniques described in this disclosure.
Figure 6B:
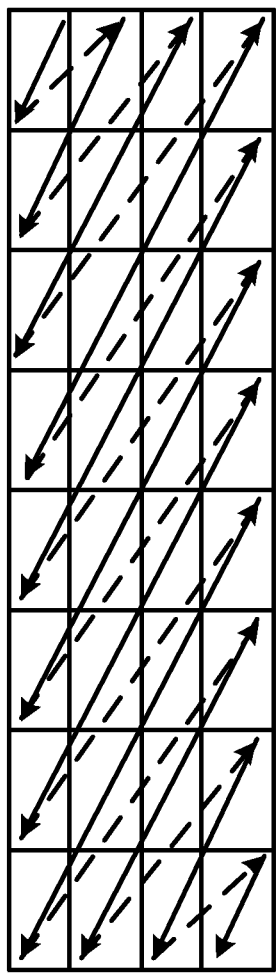

FIGS. 6A and 6B are conceptual diagrams illustrating wavefront scanning in accordance with certain techniques described in this disclosure. In the example of FIG. 6A, a non-square block of transform coefficients 120 of size 2N×N is scanned by a video coder from bottom-left to top-right starting at the shortest edge, which is the left-most edge of non-square block of transform coefficients 120. As the height is smaller than the width, the video coder scans these coefficients from the left-most boundary of non-square block of transform coefficients 120. Video encoder 20, for example, may scan quantized transform coefficients of a non-square transform unit in the order shown in FIG. 6A or 6B during entropy encoding, depending on the location of a shorter edge of the non-square transform unit, starting in an upper-left corner. As another example, video decoder 30 may entropy decode transform coefficients and then place the decoded transform coefficients in corresponding positions of non-square block of transform coefficients 120.

In the example of FIG. 6B, a non-square block of transform coefficients 122 is scanned by a video coder from top-right to bottom-left, starting at the shortest edge, which is the top-most edge of non-square block of transform coefficients 122. As the width is smaller than the height, the video coder scans these coefficients from the top-most boundary of non-square block of transform coefficients 122. Video encoder 20, for example, may scan quantized transform coefficients in the order shown during entropy encoding. As another example, video decoder 30 may entropy decode transform coefficients and then place the decoded transform coefficients in corresponding positions of non-square block of transform coefficients 122.

Figure 7A:
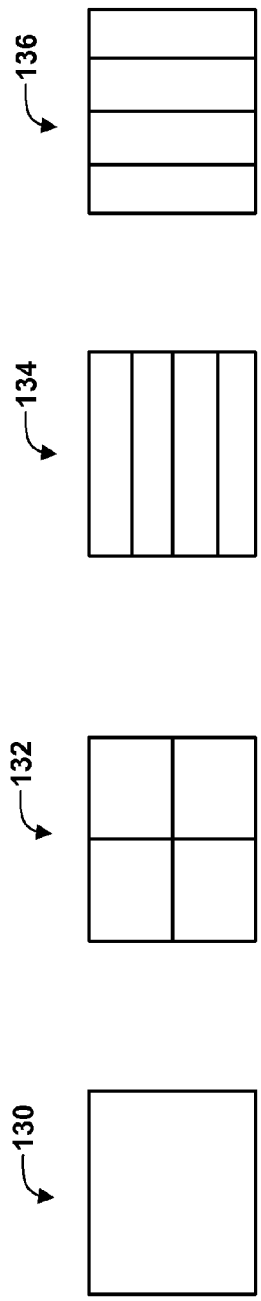
FIG. 7A is a conceptual diagram illustrating various modes for partitioning a block (e.g., a coding unit) into one or more predictive blocks (e.g., PUs).

FIG. 7A is a conceptual diagram illustrating various partitioning modes for a block (e.g., a CU) into one or more predictive blocks (e.g., PUs). In particular, block 130 illustrates an example in which the predictive block is the same size as the current block. Thus, block 130 may represent a PU that is the same size as a corresponding CU. Block 132 may be said to have a size of 2N×2N pixels, and partitioned into N×N predictive blocks. That is, block 132 is partitioned into four square, non-overlapping blocks, each of which has exactly one corner that touches a corresponding corner of the parent block.

Blocks 134 and 136 represent examples of blocks partitioned according to short distance intra prediction (SDIP). SDIP is an intra-coding technique that introduces two new partition unit types: 2N×hN and hN×2N. For a 2N×hN partition (e.g., block 134), a CU has 4 2N×hN PUs and for hN×2N (e.g., block 136), the CU has 4 hN×2N PUs. Each PU may have its own intra prediction mode (e.g., one of the 35 modes shown in FIG. 4). FIG. 7A illustrates that SDIP partitions of blocks 134 and 136 are symmetric. For block 134, the SDIP partitions are symmetric about the horizontal axis, while for block 136, the SDIP partitions are symmetric about the vertical axis. Accordingly, blocks 134 and 136 represent examples of blocks including non-square PUs, for which non-square TUs may be provided in accordance with the techniques of this disclosure. In accordance with the techniques of this disclosure, video coders such as video encoder 20 and video decoder 30 may be configured to apply non-square transforms to CUs partitioned into SDIP PUs, such as CUs 134 and 136.

Figure 7B:
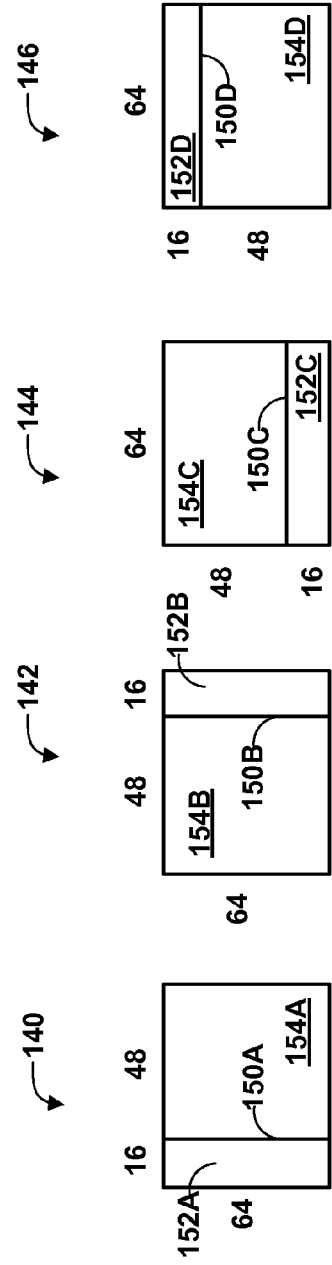
FIG. 7B is a conceptual diagram illustrating various examples of blocks partitioned into asymmetric partitions.

FIG. 7B is a conceptual diagram illustrating various examples of blocks 140-146 partitioned into asymmetric partitions. In the example of FIG. 7B, each block 140-146 is partitioned into two rectangles, where each of blocks 140-146 is originally a 2N×2N block. One rectangle has a dimension (that is, length or width) of N/2 pixels, and another rectangle has the same dimension of 3N/2 pixels. Asymmetric partitioning may result from asymmetric motion partitioning (AMP) for inter-prediction or asymmetric short-distance intra-prediction (SDIP) for intra-prediction.

In this example, each of the blocks 140, 142, 144, and 146, is a 64×64 pixel block, although other sizes of blocks (e.g., 32×32, 16×16, 128×128, or the like) may also be partitioned in a similar manner. Block 140 is horizontally divided by vertical edge 150A into two PUs, one (1/2N)*2N PU 152A and one (3/2N)*2N PU 154A. Block 142 is horizontally divided by vertical edge 150B into two PUs, one (3/2N)*2N PU 154B and one (1/2N)*2N PU 152B. Block 144 is vertically divided by horizontal edge 150C into two PUs, one 2N*(3/2N) PU 154C and one 2N*(1/2N) PU 152C. Block 146 is vertically divided by horizontal edge 150D into two PUs, one 2N*(1/2N) PU 152D and one 2N*(3/2N) PU 154D. In this manner, PUs 152, 154 of FIG. 7B may be referred to as asymmetric. Again, PUs 152, 154 of FIG. 7B may result from asymmetric motion partitioning or asymmetric SDIP partitioning, in various examples. In accordance with the techniques of this disclosure, video coders such as video encoder 20 and video decoder 30 may be configured to apply non-square transforms to CUs partitioned into asymmetric PUs, such as CUs 140, 142, 144, and 146.

Figure 8:
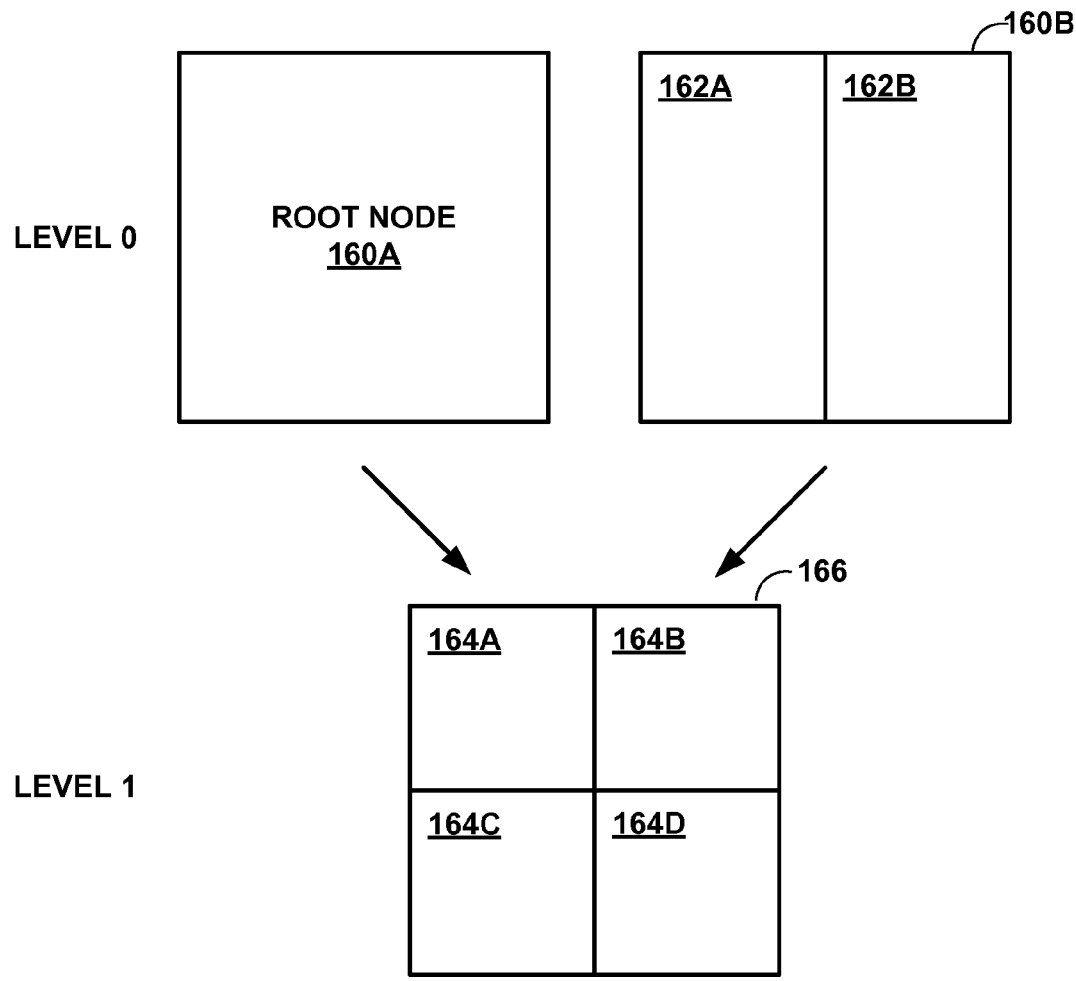
FIG. 8 is a conceptual diagram illustrating an example partitioning structure for representing non-square transform units.

FIG. 8 is a conceptual diagram illustrating an example partitioning structure for representing non-square transform units. The partitioning structure may correspond to a residual quadtree (RQT). In general, an RQT may have various levels, as discussed above. In the example of FIG. 8, TUs corresponding to level 0 of an RQT may either have a square shape, such as root node 160A, or a non-square shape, such as root node 160B, which is divided into two non-square transform units 162A and 162B.

In this example, in order to indicate that a TU of a CU has a size of 2N×2N, a video coder may code a value indicating that the TU corresponds to level 0 of the RQT, and further code a transform selection flag indicating that the TU corresponds to a shape similar to that of root node 160A. On the other hand, to indicate that a CU includes non-square TUs, the video coder may code a value indicating that TUs correspond to level 0 of the RQT and code a transform selecting flag indicating that the TUs correspond to shapes similar to that of transform units 162A, 162B of root node 160B. In some examples, video coders may further determine whether TUs 162A, 162B have a longer height than width based on PUs for the corresponding CU, or may code data indicative of whether the length is longer than the width.

TUs 164A-164D of node 166, corresponding to level 1 of the RQT shown in FIG. 8 (also referred to as a child transform unit), have a size of N×N, and thus, also have a square shape. Accordingly, a video coder may code a value indicating that TUs of a CU correspond to level 1 of the RQT of FIG. 8, to indicate that the TUs have a size of N×N. Because only N×N TUs are at level 1, in this example, no further information need be coded to indicate the size and shape of the TUs. For example, a video coder need not code a transform selection flag when TUs correspond to level 1 of the RQT, because level 1 only includes one option for TU size and shape in this example.

In some examples, video encoder 20 may perform a first coding pass of a CU (which may be partitioned into one or more square or non-square PUs) in various examples using TUs having sizes corresponding to TUs 164A-164D. Video encoder 20 may analyze performance metrics resulting from this first coding pass, and may subsequently perform a second coding pass of the CU using TUs corresponding to TUs 162A and 162B (or horizontally oriented non-square TUs, in relevant examples). Video encoder 20 may then analyze performance metrics resulting from this second coding pass and compare the metrics resulting from the first coding pass to the metrics resulting from the second coding pass. If the metrics from the first coding pass are better, video encoder 20 may select TUs having sizes corresponding to TUs 164A-164D.

On the other hand, if the metrics from the second coding pass are better, video encoder 20 may perform a third coding pass using a TU having a size corresponding to root node 160A, and analyze metrics resulting from this third coding pass. Moreover, video encoder 20 may compare the metrics from the third coding pass to the metrics from the second coding pass. If the metrics from the second coding pass are better, video encoder 20 may select TUs having sizes corresponding to TUs 162A, 162B. On the other hand, if the metrics from the third coding pass are better, video encoder 20 may select a TU having a size corresponding to root node 160A.

Figure 9:
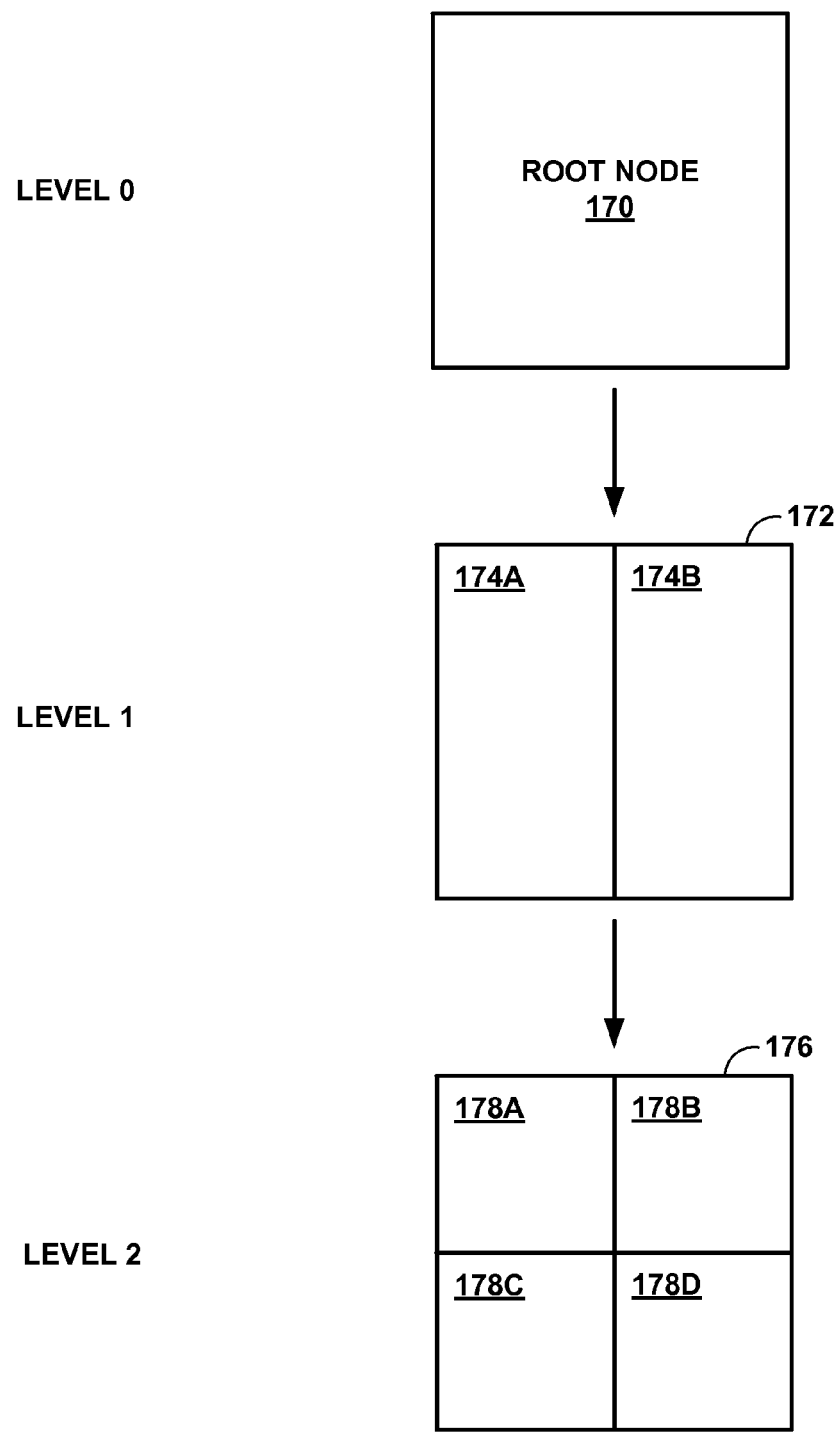
FIG. 9 is a conceptual diagram illustrating another example partitioning structure for representing non-square transform units.

FIG. 9 is a conceptual diagram illustrating another example partitioning structure for representing non-square transform units. In this example, root node 170, corresponding to level 0 of the RQT, has a size of 2N×2N. Node 172, corresponding to level 1 of the RQT, includes two TUs 174A, 174B (also referred to as a child transform units) having sizes of 2N×N. Node 176, corresponding to level 2 of the RQT, includes four TUs 178A-178D of size N×N.

In this example, a video coder may code information indicating whether TUs of a CU correspond to level 0, 1, or 2 of the RQT. In this example, when TUs of a CU correspond to level 0 or 2, the TUs are square, whereas when the TUs correspond to level 1, the TUs are non-square. Additional information may be coded to indicate whether non-square TUs have heights longer than widths, or this may be determined based on other information, such as whether PUs of the CU have heights longer than widths.

Video encoder 20 may determine whether to use TUs corresponding to level 0, 1, or 2 of the example RQT of FIG. 9 in a manner conforming substantially to that described with respect to FIG. 8. For example, video encoder 20 may compare results of using TUs at level 2 to results of using TUs at level 1, and if the results of using TUs at level 1 are better, compare results of using TUs at level 0 to the results of using TUs at level 1. Video encoder 20 may select the TU sizes based on these results. Video encoder 20 may code information indicative of the selected TU sizes and shapes, and video decoder 30 may decode such information to determine TU sizes and shapes.

FIG. 10A is a conceptual diagram illustrating example signaling data for signaling whether a CU includes square or non-square TUs. In this example, the signaling data includes split flag 180, transform selection (TS) flag 182, a luminance coded block flag (luma CBF) 184, a blue hue chrominance CBF (chroma-u CBF) 186, and a red hue chrominance CBF (chroma-v CBF) 188. Split flag 180 may indicate whether a root-level transform is adopted or whether a smaller transform is used. For example, split flag 180 may have a first value (e.g., 0) to indicate that a root node TU size is used or a second value (e.g., 1) to indicate that the root node TU is split into smaller TUs. Thus, the signaling data of FIG. 10A may correspond to an RQT such as that illustrated in FIG. 8.

TS flag 182 may have a value indicating whether square or non-square transform units are used for the given CU. For example, when split flag 180 indicates that a root-level TU is used, TS flag 182 may indicate whether the root-level TU is square (e.g., 2N×2N) or non-square (e.g., 2N×N or N×2N). Thus, with respect to the example of FIG. 8, split flag 180 may be set to a value of 0 to indicate that a leaf node CU has TUs at level 0; a value of 0 for TS flag 182 may indicate that the CU has a TU corresponding to root node 160A, and a value of 1 for TS flag 182 may indicate that the CU has two TUs corresponding to TUs 162A, 162B. TS flag 182 need not be coded when split flag 180 indicates that a higher level (e.g., level 1) of the RQT is used, in some examples.

Each CU may include TUs for three different components: a luminance component indicating brightness values and two chrominance components indicating color values (e.g., blue and red hues). The TUs for the various components may each be split in the same manner, and thus, may all be either square or non-square as indicated by data for the RQT. Moreover, luma CBF 184 may have a value indicating whether at least one coefficient of a TU for a luminance component is non-zero, that is, significant. A TU is said to be "coded" when there is at least one non-zero coefficient of the TU, that is, when there is at least one significant coefficient. Likewise, chroma-U CBF 186 may indicate whether at least one coefficient of a TU for a first chrominance component (e.g., the blue hue chroma component) is non-zero, while chroma-V CBF 188 may indicate whether at least one coefficient of a TU for a second chrominance component (e.g., the blue hue chroma component) is non-zero.

In some examples, when TS flag 182 indicates that TUs have a non-square shape, multiple CBFs may be coded for each component. For example, for non-square TUs 162A, 162B (FIG. 8), two CBFs may be coded for each component (CBF-Y0 and CBF-Y1, CBF-U0 and CBF-U1, and CBF-V0 and CBF-V1).

FIG. 10B is a conceptual diagram illustrating an alternative example of signaling data for signaling whether a CU includes square or non-square TUs. Split flag 190 may conform substantially to split flag 180 (FIG. 10A). TS flag 192 may correspond substantially to transform selection flag 182 (FIG. 10A). However, in this example, TS flag 192 need only be coded when split flag 190 indicates that a root node TU is split, such that higher levels of the RQT are used. Thus, the signaling data of FIG. 10B may correspond to an RQT such as that illustrated in FIG. 9.

In addition, the signaling data of FIG. 10B includes CBFYY flag 194. CBFYY flag 194 may represent a single CBF-Y flag when a corresponding TU is square, or two CBF-Y flags of non-square corresponding luma TUs. For the non-square luma TUs, referred to as Y0 and Y1, CBFYY flag 194 may have a value representing an OR of CBF-Y0 and CBF-Y1 flags. Thus, if either or both of TUs Y0 and Y1 have a non-zero coefficient, CBFYY flag 194 may have a value indicating that at least one of TUs Y0 and Y1 have a non-zero coefficient. Accordingly, to indicate which of TUs Y0 and Y1 have a non-zero coefficient, values may be coded for CBFY0 flag 196 and CBFY1 flag 198. CBFY0 flag 196 may indicate whether TU Y0 has a non-zero coefficient, while CBFY1 flag 198 may indicate whether TU Y1 has a non-zero coefficient. On the other hand, if both of TUs Y0 and Y1 have all zero-valued coefficients, CBFY0 flag 196 and CBFY1 flag 198 need not be explicitly coded, but may be inferred from the CBFYY flag 194 to indicate that TUs Y0 and Y1 each have all zero-valued coefficients.

Likewise, CBFUV flag 200 may represent an OR of CBF-U and CBF-V flags for corresponding TUs. That is, CBFUV flag 200 may indicate whether at least one of a chroma-U TU and a chroma-V TU has a non-zero valued coefficient. When CBFUV flag 200 indicates that at least one of a chroma-U TU and a chroma-V TU has a non-zero valued coefficient, CBF-U flag 202 may be coded to indicate whether a chroma-U TU has a non-zero coefficient, and CBF-V flag 204 may be coded to indicate whether a chroma-V TU has a non-zero coefficient. CBF-U flag 202 and CBF-V flag 204 need not be coded when CBFUV flag 200 indicates that the chroma-U TU and chroma-V TU have all zero-valued coefficients. In some examples, additional flags may be provided for the chrominance components when split flag 190 indicates that the TU is split, e.g., CBFU flags for U1, U2, V1, and V2.

In some examples, split flag 190, CBFYY flag 194, and CBF UV flag may be jointly coded, e.g., using VLC, golomb coding, unary coding, run-length coding, or other joint coding methodologies. This joint coding may exploit correlation among different flags.

Figure 11:
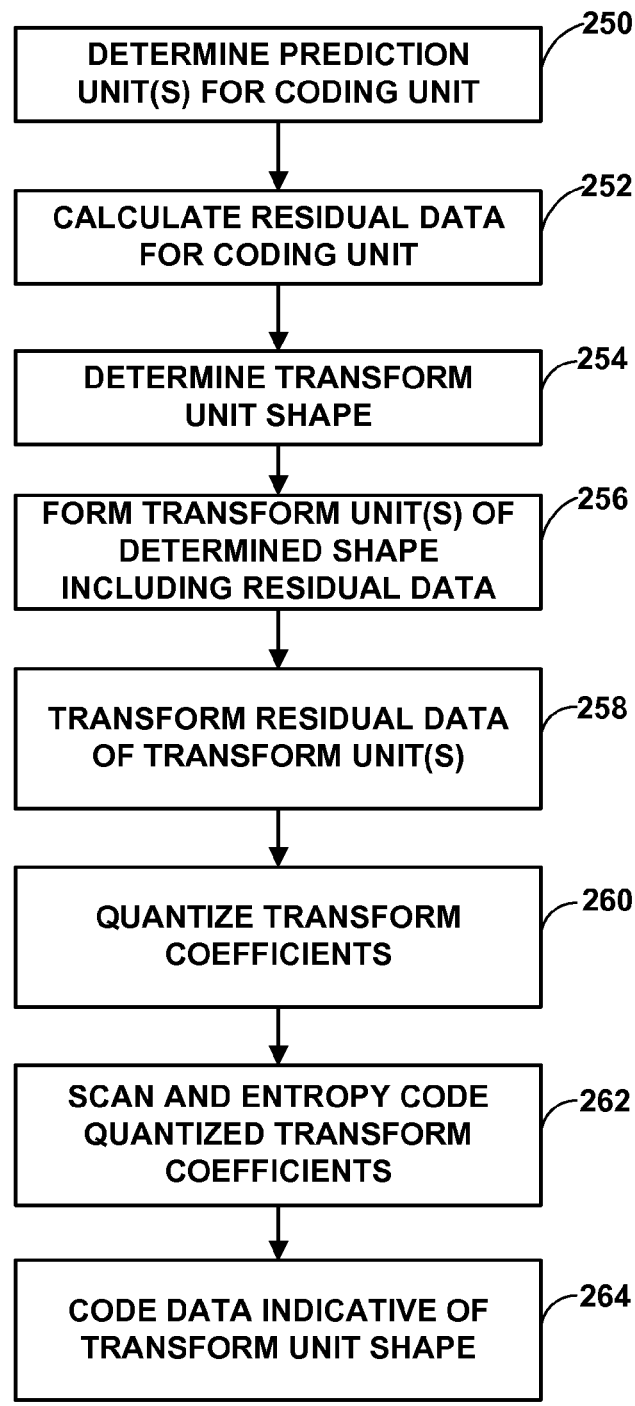
FIG. 11 is a flowchart illustrating an example method for encoding video data using square or non-square transform units.

FIG. 11 is a flowchart illustrating an example method for encoding video data using square or non-square transform units. The method of FIG. 11 is explained with respect to video encoder 20 for purposes of example and explanation. However, it should be understood that other video coding devices may be configured to perform a similar method. The steps of the method need not necessarily be performed in the order shown, and certain steps may be performed in parallel rather than in sequence.

Initially, video encoder 20 may determine one or more prediction units for a current coding unit (250). For example, video encoder 20 may perform several coding passes to determine a partitioning strategy for partitioning a coding unit into one or more prediction units (PUs). The PUs may be square or non-square. For example, for a 2N×2N CU, there may be a 2N×2N PU, 2N×N PUs, N×2N PUs, 2N×N/2 PUs, N/2×2N PUs, 2N×nU PUs, 2N×nD PUs, nL×2N PUs, nR×2N PUs, or other sizes of PUs, e.g., as a result of conventional partitioning, asymmetric motion partitioning, short distance intra prediction partitioning, or asymmetric short distance intra prediction partitioning.

In any case, video encoder 20 may also calculate residual data for the coding unit (252). That is, after forming the PUs, video encoder 20 may calculate pixel-by-pixel differences between raw pixel values for the CU and predicted pixel values of the PUs to form residual data. Video encoder 20 may further determine transform unit shapes (254), e.g., square or non-square TUs. In some examples, video encoder 20 may select the TU shapes based at least in part on the PU shapes, as described above. Likewise, video encoder 20 may select the TU shapes based at least in part on whether the TUs correspond to chrominance or luminance components. Moreover, as described above, video encoder 20 may perform multiple coding passes to compare coding results of using square TU shapes to non-square TU shapes. These multiple coding passes may be performed contemporaneously with coding passes to determine PU shapes, or may be performed after selecting the PU shapes.

In any case, after determining the TU shapes, video encoder 20 may form transform unit(s) of the determined shape, including the residual data (256). Video encoder 20 may then apply transforms to the residual data of the transform unit(s) (258) to transform the residual data from the pixel domain to a transform domain (e.g., a frequency domain), in the form of transform coefficients. Video encoder 20 may further quantize the transform coefficients (260). As discussed above, quantizing the transform coefficients may be based at least on part on whether the TUs are square or non-square. For example, video encoder 20 may offset a quantization parameter for the TUs by a value determined based on whether the TUs are square or non-square.

Video encoder 20 may then scan and entropy code the quantized transform coefficients (262). Again, as discussed above, the scan and entropy coding may be based on whether the TUs are square or non-square. For example, the scan may begin at a shorter-length edge of non-square TUs, and context may be selected for CABAC coding of the coefficients based on whether the TUs are non-square. Furthermore, video encoder 20 may code data indicative of the TU shape (264). The data indicative of the TU shape may correspond to the syntax data described with respect to FIG. 10A or 10B, in some examples.

In this manner, the method of FIG. 11 represents an example of a method including coding information indicative of whether a transform unit of the video data is square or non-square, and coding data of the transform unit based at least in part on whether the transform unit is square or non-square. In particular, coding the data of the transform unit may include calculating residual data for at least a portion of a coding unit, transforming the residual data to produce transform coefficients, quantizing the transform coefficients, and encoding quantized transform coefficients of the transform unit based on whether the transform unit is square or non-square. Likewise, coding the information indicative of whether the transform unit is square or non-square may include encoding the information indicative of whether the transform unit is square or non-square. Moreover, the method may further include comparing results of coding the coding unit using square transform units to results of coding the coding unit using non-square transform units, and selecting either square transform units or non-square transform units based on the comparison.

Figure 12:
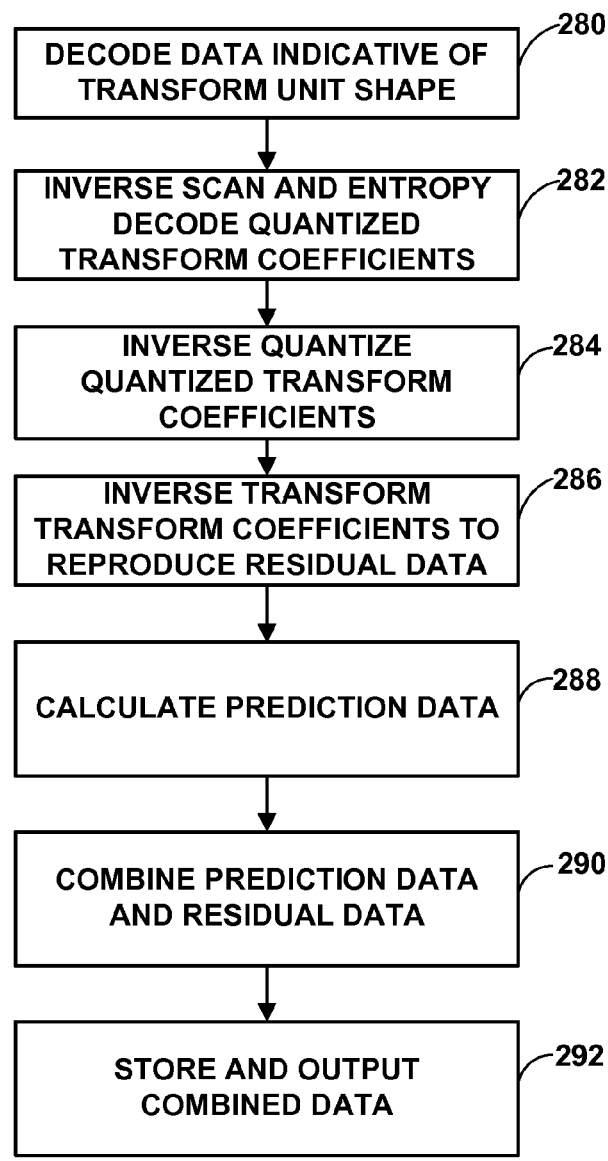
FIG. 12 is a flowchart illustrating an example method for decoding video data using square or non-square transform units.

FIG. 12 is a flowchart illustrating an example method for decoding video data using square or non-square transform units. The method of FIG. 12 is explained with respect to video decoder 20 for purposes of example and explanation. However, it should be understood that other video coding devices may be configured to perform a similar method. Likewise, the steps of the method need not necessarily be performed in the order shown, and certain steps may be performed in parallel rather than in sequence.

In this example, video decoder 30 may decode data indicative of a transform unit shape (280). In some examples, this data may also represent a corresponding prediction unit shape. In other examples, the data may correspond to the syntax data described with respect to FIG. 10A or 10B, in some examples. In this manner, video decoder 30 may determine a shape of a TU for a current CU.

Video decoder 30 may then inverse scan and entropy decode quantized transform coefficients of the TU (282). As discussed above, the scan and entropy decoding (e.g., context selection for CABAC) may be based on whether the TU is square or non-square. Video decoder 30 may inverse scan the decoded quantized transform coefficients to reproduce a two-dimensional matrix, in the form of the TU, including the quantized transform coefficients, where the matrix has the shape of the square or non-square TU as determined. Furthermore, video decoder 30 may inverse quantize the quantized transform coefficients (284), which may be based on whether the TU is square or non-square, as discussed above. Video decoder 30 may further inverse transform the transform coefficients of the TU to reproduce residual data in the pixel domain (286).

Video decoder 30 may also calculate prediction data (288) for a PU corresponding to the TU. For example, video decoder 30 may intra-predict data from neighboring, previously coded pixels of a current picture or slice including the current CU, or inter-predict data from previously coded pictures using motion vector data for the current CU. In any case, video decoder 30 may then combine the prediction and residual data to reproduce the current CU (290). Subsequently, video decoder 30 may store the decoded CU, e.g., for use as reference for subsequent decoding, and after reproducing a full picture, may output the decoded CU, thereby storing and outputting the combined data (292).

In this manner, the method of FIG. 12 represents an example of a method including coding information indicative of whether a transform unit of the video data is square or non-square, and coding data of the transform unit based at least in part on whether the transform unit is square or non-square. In particular, coding the information indicative of whether the transform unit of the video data is square or non-square may include decoding the information indicative of whether the transform unit of the video data is square or non-square. Likewise, coding the data of the transform unit may include decoding quantized transform coefficients of the transform unit based on whether the transform unit is square or non-square, inverse quantizing the quantized transform coefficients, and inverse transforming the transform coefficients to produce residual data for at least a portion of a coding unit corresponding to the transform unit.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method of coding video data, the method comprising:
 determining a size of a coding unit of the video data representative of a quadtree data structure, wherein the quadtree data structure defines the size for a coding unit of the video data;
 determining that a transform unit of the coding unit is non-square, wherein the transform unit corresponds to a level of a residual quadtree transform (RQT) data structure; and
 applying a non-square transform to the video data, including coding data of the transform unit based at least in part on the transform unit being non-square, and including selecting context for coding the data based on a location of a shorter edge of the transform unit.

2. The method of claim 1, wherein determining that the transform unit of the coding unit is non-square based at least in part on a transform selection flag.

3. The method of claim 2, wherein the transform unit comprises a child transform unit, and wherein determining that the transform unit of the coding unit is non-square comprises determining that the transform unit of the coding unit is non-square only when a parent transform unit of the child transform unit is split.

4. The method of claim 1, wherein determining that the transform unit of the coding unit is non-square comprises determining the level of the RQT data structure to which the transform unit corresponds.

5. The method of claim 1, wherein determining that the transform unit of the coding unit is non-square is based at least in part on the transform unit corresponding to a luminance component.

6. The method of claim 1, wherein determining that the transform unit of the coding unit is non-square is based at least in part on a prediction unit corresponding to the transform unit being non-square.

7. The method of claim 1, wherein determining that the transform unit of the coding unit is non-square comprises determining that a prediction unit corresponding to the transform unit is non-square.

8. The method of claim 1, further comprising determining a quantization parameter for the transform unit based on the transform unit being non-square.

9. The method of claim 1, further comprising, applying a scan pattern to transform coefficients of the transform unit that begins at a shorter edge of the transform unit.

10. The method of claim 1,
 wherein determining that the transform unit of the coding unit is non-square comprises decoding information indicative of the transform unit being non-square, and
 wherein coding the data of the transform unit comprises:
  decoding quantized transform coefficients of the transform unit based on the transform unit being non-square;
  inverse quantizing the quantized transform coefficients; and
  inverse transforming the transform coefficients to produce residual data for at least a portion of the coding unit corresponding to the transform unit.

11. The method of claim 1,
 wherein coding the data of the transform unit comprises:
  calculating residual data for at least a portion of the coding unit;
  transforming the residual data to produce transform coefficients;
  quantizing the transform coefficients; and
  encoding quantized transform coefficients of the transform unit based on the transform unit being non-square, and
 wherein determining that the transform unit of the coding unit is non-square comprises encoding the information indicative of the transform unit being non-square.

12. The method of claim 11, further comprising:
 comparing results of coding the coding unit using square transform units to results of coding the coding unit using non-square transform units; and
 selecting either the square transform units or the non-square transform units based on the comparison.

13. The method of claim 1, the method being executable on a wireless communication device, wherein the device comprises:
 a memory configured to store the video data;
 a processor configured to execute instructions to process the video data stored in said memory; and
 a receiver configured to receive the video data.

14. The method of claim 13, wherein the wireless communication device is a cellular telephone and the video data is received by the receiver and modulated according to a cellular communication standard.

15. A device for coding video data, the device comprising:
 a memory configured to store the video data; and
 a video coder configured to:
  determine a size of a coding unit of the video data representative of a quadtree data structure, wherein the quadtree data structure defines the size for a coding unit of the video data stored in the memory,
  determine that a transform unit of the coding unit is non-square, wherein the transform unit corresponds to a level of a residual quadtree transform (RQT) data structure, and
  apply a non-square transform to the video data, including code data of the transform unit based at least in part on the transform unit being non-square, and including select context for coding the data based on a location of a shorter edge of the transform unit.

16. The device of claim 15, wherein to determine that the transform unit of the coding unit is non-square is based at least in part on a transform selection flag.

17. The device of claim 16, wherein the transform unit comprises a child transform unit, and wherein the video coder is configured to determine that the transform unit of the coding unit is non-square only when a parent transform unit of the child transform unit is split.

18. The device of claim 15, wherein to determine that the transform unit of the coding unit is non-square, the video coder is configured to determine the level of the RQT data structure to which the transform unit corresponds.

19. The device of claim 15, wherein the video coder is configured to determine that the transform unit of the coding unit is non-square based at least in part on the transform unit corresponding to a luminance component.

20. The device of claim 15, wherein the video coder is configured to determine that the transform unit of the coding unit is non-square based at least in part on a prediction unit corresponding to the transform unit being non-square.

21. The device of claim 15, wherein todetermine that the transform unit of the coding unit is non-square, the video coder is configured to determine that a prediction unit corresponding to the transform unit is non-square.

22. The device of claim 15, wherein the video coder is further configured to determine a quantization parameter for the transform unit based on the transform unit being non-square.

23. The device of claim 15, wherein the video coder is configured to apply a scan pattern to transform coefficients of the transform unit that begins at a shorter edge of the transform unit.

24. The device of claim 15,
wherein the video coder comprises a video decoder, wherein to determine that the transform unit of the coding unit is non-square, the video decoder is configured to decode information indicative of the transform unit being non-square, and
wherein to code the data of the transform unit, the video decoder is configured to decode quantized transform coefficients of the transform unit based on the transform unit being non-square, inverse quantize the quantized transform coefficients, and inverse transform the transform coefficients to produce residual data for at least a portion of the coding unit corresponding to the transform unit.

25. The device of claim 15, wherein the video coder comprises a video encoder, wherein to code the data of the transform unit, the video encoder is configured to calculate residual data for at least a portion of the coding unit, transform the residual data to produce transform coefficients, quantize the transform coefficients, and encode the quantized transform coefficients of the transform unit based on the transform unit being non-square, and wherein to determine that the transform unit of the coding unit is non-square, the video encoder is configured to encode the information indicative of the transform unit being non-square.

26. The device of claim 15, wherein the video coder is implemented in a processor, and wherein the device is a wireless communication device, further comprising:
a receiver configured to receive the video data.

27. The device of claim 26, wherein the wireless communication device is a cellular telephone and the video data is received by the receiver and modulated according to a cellular communication standard.

28. A method of coding video data, the method comprising:
determining that a transform unit of a coding unit of the video data is non-square; and
applying a non-square transform to the video data, including coding data of the transform unit based at least in part on the transform unit being non-square, and including selecting context for coding the data based on a location of a shorter edge of the transform unit.

29. The method of claim 28, wherein determining that the transform unit of the coding unit is non-square based at least in part on a transform selection flag.

30. The method of claim 29, wherein the transform unit comprises a child transform unit, and wherein determining that the transform unit of the coding unit of the video data is non-square comprises determining that the transform unit of the coding unit of the video data is non-square only when a parent transform unit of the child transform unit is split.

31. The method of claim 28, wherein determining that the transform unit of the coding unit of the video data is non-square comprises determining a level of a residual quadtree transform (RQT) data structure to which the transform unit corresponds.

32. The method of claim 28, wherein determining that the transform unit of the coding unit of the video data is non-square is based at least in part on the transform unit corresponding to a luminance component.

33. The method of claim 28, further comprising determining a quantization parameter for the transform unit based on the transform unit being non-square.

34. The method of claim 28, further comprising, applying a scan pattern to transform coefficients of the transform unit that begins at a shorter edge of the transform unit.

35. The method of claim 28, the method being executable on a wireless communication device, wherein the device comprises:
a memory a memory configured to store the video data;
a processor configured to execute instructions to process the video data stored in said memory; and
a receiver configured to receive the video data.

36. The method of claim 35, wherein the wireless communication device is a cellular telephone and the video data is received by the receiver and modulated according to a cellular communication standard.

37. A device for coding video data, the device comprising:
a memory configured to store the video data; and
a video coder configured to:
determine that a transform unit of a coding unit of the video data is non-square, and
apply a non-square transform to the video data, including code data of the transform unit based at least in part on the transform unit being non-square, and including selecting context for coding the data based on a location of a shorter edge of the transform unit.

38. The device of claim 37, wherein to determine that the transform unit of the coding unit is non-square is based at least in part on a transform selection flag.

39. The device of claim 38, wherein the transform unit comprises a child transform unit, and wherein the video coder is configured to determine that the transform unit of the coding unit is non-square only when a parent transform unit of the child transform unit is split.

40. The device of claim 37, wherein to determine that the transform unit of the coding unit is non-square, the video coder is configured to determine a level of a residual quadtree (RQT) data structure to which the transform unit corresponds.

41. The device of claim 37, wherein the video coder is configured to determine that the transform unit of the coding unit is non-square based at least in part on the transform unit corresponding to a luminance component.

42. The device of claim 37, wherein the video coder is configured to determine that the transform unit of the coding unit is non-square based at least in part on the transform unit corresponding to a luminance component.

43. The device of claim 37, wherein the video coder is further configured to determine a quantization parameter for the transform unit based on the transform unit being non-square.

44. The device of claim 37, wherein the video coder is configured to apply a scan pattern to transform coefficients of the transform unit that begins at a shorter edge of the transform unit.

45. The device of claim 37, wherein the video coder is implemented in a processor, and wherein the device is a wireless communication device, further comprising:
a receiver configured to receive the video data.

46. The device of claim 45, wherein the wireless communication device is a cellular telephone and the video data is received by the receiver and modulated according to a cellular communication standard.

* * * * *